United States Patent
Ishino et al.

(10) Patent No.: US 8,363,492 B2
(45) Date of Patent: Jan. 29, 2013

(54) DELAY ADJUSTMENT DEVICE AND DELAY ADJUSTMENT METHOD

(75) Inventors: Kouichi Ishino, Osaka (JP); Takeshi Nakayama, Hyogo (JP); Masahiro Ishii, Hyogo (JP)

(73) Assignee: Panasonic Corporation, Osaka (JP)

( * ) Notice: Subject to any disclaimer, the term of this patent is extended or adjusted under 35 U.S.C. 154(b) by 208 days.

(21) Appl. No.: 13/056,020

(22) PCT Filed: May 27, 2010

(86) PCT No.: PCT/JP2010/003568
§ 371 (c)(1),
(2), (4) Date: Feb. 11, 2011

(87) PCT Pub. No.: WO2010/137330
PCT Pub. Date: May 27, 2010

(65) Prior Publication Data
US 2011/0128060 A1    Jun. 2, 2011

(30) Foreign Application Priority Data

May 27, 2009   (JP) .................................. 2009-127341

(51) Int. Cl.
*G11C 7/00* (2006.01)
(52) U.S. Cl. ............ 365/194; 365/189.011; 365/189.15; 365/189.16; 365/189.05; 365/189.12; 365/193; 365/201; 365/211; 365/233.1; 365/233.12; 365/233.18
(58) Field of Classification Search ........... 365/189.011, 365/189.15, 189.16, 189.05, 189.12, 193, 365/194, 201, 211, 233.1, 233.12, 233.18
See application file for complete search history.

(56) References Cited

U.S. PATENT DOCUMENTS

| | | | |
|---|---|---|---|
| 6,570,944 | B2 | 5/2003 | Best et al. |
| 6,593,930 | B1 | 7/2003 | Sheaffer et al. |
| 7,759,998 | B2 | 7/2010 | Ishikawa |
| 2006/0101304 | A1 | 5/2006 | Miura |
| 2012/0106264 | A1* | 5/2012 | Chong et al. ............. 365/189.02 |
| 2012/0170389 | A1* | 7/2012 | Kizer et al. .................. 365/193 |

FOREIGN PATENT DOCUMENTS

| | | |
|---|---|---|
| JP | 2001-154907 | 6/2001 |
| JP | 2003-99321 | 4/2003 |
| JP | 2006-134196 | 5/2006 |
| JP | 2007-202033 | 8/2007 |
| JP | 4065234 | 1/2008 |
| WO | 02/01363 | 1/2002 |

OTHER PUBLICATIONS

International Search Report issued Aug. 24, 2010 in International (PCT) Application No. PCT/JP2010/003568.

* cited by examiner

*Primary Examiner* — Fernando Hidalgo
(74) *Attorney, Agent, or Firm* — Wenderoth, Lind & Ponack, L.L.P.

(57) ABSTRACT

Provided is a delay adjustment device for adjusting delay of a strobe signal, which specifies when to read a data signal on a data line, with respect to the data signal in order to perform data transfer with an external memory. A testing unit 150 included in a delay adjustment unit is provided with a memory bandwidth monitoring unit 212 that monitors memory bandwidth in use on the data line used for data transfer with a memory circuit. The testing unit 150 performs delay adjustment when the memory bandwidth in use is lower than a predetermined threshold. Delay adjustment is performed by delaying the strobe signal from the data signal by a variety of predetermined delays and determining whether data transfer is successful at each delay, calculating an optimal delay, and thereafter delaying the strobe signal by the calculated delay.

12 Claims, 15 Drawing Sheets

FIG. 6

| Strobe signal delay | Success indicators ||||| 
| --- | --- | --- | --- | --- | --- |
| | 1st test | 2nd test | 3rd test | 4th test | 5th test |
| Current − 30 ps | × | × | × | ○ | × |
| Current − 20 ps | ○ | × | × | × | × |
| Current − 10 ps | ○ | ○ | × | ○ | ○ |
| Current | ○ | ○ | ○ | ○ | ○ |
| Current + 10 ps | ○ | ○ | ○ | ○ | ○ |
| Current + 20 ps | ○ | ○ | ○ | ○ | ○ |
| Current + 30 ps | ○ | × | ○ | × | ○ |

FIG. 14

| Bandwidth \ Temperature | 0~40 °C | 40 °C~ |
|---|---|---|
| 1200 Mbps | 54 ps | 62 ps |
| 2400 Mbps | 58 ps | 65 ps |

DELAY ADJUSTMENT DEVICE AND DELAY ADJUSTMENT METHOD

TECHNICAL FIELD

The present invention relates to delay adjustment of a strobe signal that determines the timing at which a data signal is to be read.

BACKGROUND ART

During conventional data transmission between memory and a System on Chip (SoC) that sends and receives data, the component that reads data does so by reading a data signal along a data line. The component reads the data signal upon receiving a strobe signal, which defines the timing at which to read the data signal. More specifically, the component reads the data signal along the data line upon detecting the rising edge of the strobe signal.

As shown in FIG. 15, an SoC 1500 and memory 1501 are connected by a data line and a strobe line. If the timing at which data is on the data line becomes misaligned from the rising of the strobe signal, data cannot be read correctly. To allow for some fluctuation in the rising edge of the strobe signal, delay adjustment is therefore necessary to set the strobe signal to rise in the middle of the period when the data signal is on the data line. In other words, in FIG. 15, it is necessary to delay the strobe signal so that, while the data signal is on the data line, the rising edge of the strobe signal coincides with the delay E. Note that the term "delay" refers to the length of time from when the data signal is first transmitted on the data line until the rising of the strobe signal.

During delay adjustment, when the SoC 1500 itself outputs data, the rising of the strobe signal should be aligned with the middle of the period when the data is on the data line. To achieve this alignment, the SoC 1500 can output a data signal and a strobe signal to the memory 1201 synchronously, while causing only the strobe signal to pass through a prescribed number of delay elements located in the SoC 1500.

On the other hand, the memory 1501 can only align the start and the duration of output of a data signal with the rising edge and falling edge of a strobe signal. Accordingly, the SoC 1500 itself has to delay a strobe signal received from the memory 1501, detect the rise of the strobe signal thus delayed, and then read data. Delay adjustment refers to determining how much to delay the strobe signal and then delaying the strobe signal by the determined amount.

Patent Literature 1 discloses a device that performs delay adjustment at the time of system startup or system reset.

CITATION LIST

Patent Literature

[Patent Literature 1] Japanese Patent Application Publication No. 2007-202033

SUMMARY OF INVENTION

Technical Problem

As an SoC continues to operate, however, the timing of the data signal and the strobe signal may become misaligned due to degradation over time, for example. Furthermore, the operating temperature of an SoC varies by the load condition. Depending on temperature characteristics, the timing of operations may vary, leading to misalignment between timing of the data signal and the strobe signal.

In recent years, the operation clock of an SoC has become high speed. Accordingly, the period during which a data signal is carried on the data line has become short. This means that extreme precision is required for the timing of the rise of the strobe signal, with current specifications often requiring timing on the order of picoseconds.

In such specifications, misalignment between the data signal and the strobe signal prohibits proper data transmission, leading to system malfunction.

It is thus an object of the present invention to provide a delay adjustment device that reduces the occurrence of such misalignment and that hinders proper system operation to a lesser degree.

Solution to Problem

In order to solve the above problems, a delay adjustment device according to the present invention is installed on an apparatus connected to an external memory by a data line and a strobe line, the data line carrying a data signal, and the strobe line carrying a strobe signal that specifies when to read the data signal, the delay adjustment device performing delay adjustment on the strobe signal and comprising: a memory bandwidth monitoring unit operable to monitor a memory bandwidth and to successively output memory bandwidth information indicating the memory bandwidth, the memory bandwidth representing an amount of data transferred during transmission between the external memory and the apparatus; and a delay adjustment unit operable to perform the delay adjustment on the strobe signal with respect to the data signal in accordance with the memory bandwidth indicated by the memory bandwidth information.

Advantageous Effects of Invention

With the above structure, the delay adjustment device monitors the memory bandwidth in use between the device and the memory even while the system is operating. When the memory bandwidth in use is low, not much data is being transferred between the device that performs data transfer and the memory. The delay adjustment is performed between the device that performs data transfer and the memory by actually transferring data while progressively delaying the strobe signal. The delay of the strobe signal is determined in accordance with the success or failure of data transfer. It follows that although data transfer for delay adjustment cannot be performed when the memory bandwidth used in actual data transfer is at least a fixed amount, data transfer for delay adjustment can be performed when the memory bandwidth in use is equal to or less than the fixed amount. Accordingly, delay adjustment is performed even when the system is operating. Misalignment between the data signal and the strobe signal is thus controlled better than in a conventional configuration, since delay adjustment is responsive to an operating environment that changes in accordance with heat produced by system operation.

BRIEF DESCRIPTION OF DRAWINGS

FIG. 6 is a data conceptual diagram showing an example data structure of a determination result table used during testing.

FIG. 14 is a data conceptual diagram showing an example of temperature dependent delay information.

DESCRIPTION OF EMBODIMENTS

Embodiment 1

With reference to the drawings, the following describes a semiconductor device as a first Embodiment of a delay adjustment device according to the present invention.
<Structure>

Figure 1:
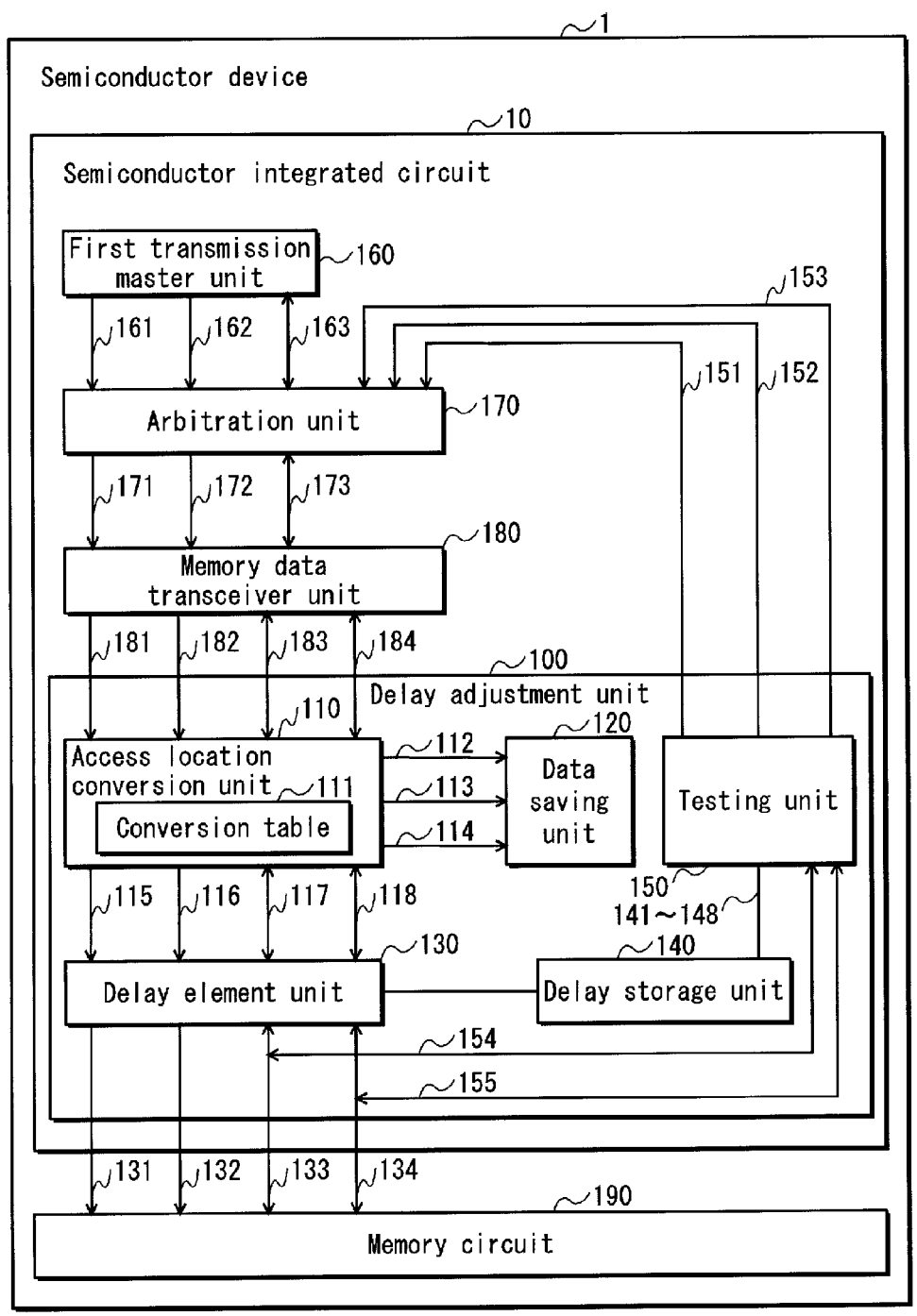
FIG. 1 is a functional block diagram showing the structure of a semiconductor device 1 according to Embodiment 1.

FIG. 1 is a functional block diagram showing the structure of a semiconductor device 1. The semiconductor device 1 is used in consumer and industrial products such as a digital broadcast reception device, cellular phone, Blu-ray Disc (BD) playback device, BD recording device, etc. The semiconductor device 1 includes a semiconductor integrated circuit 10 and a memory circuit 190.

The semiconductor integrated circuit 10 is electronic circuitry on a semiconductor, such as an SoC, that implements a variety of functions such as video decoding, data transfer, etc. The semiconductor integrated circuit 10 includes the function of transmitting data to, and receiving data from, a memory circuit 190. As shown in FIG. 1, the semiconductor integrated circuit 10 includes a delay adjustment unit 100, first transmission master unit 160, arbitration unit 170, and memory data transceiver unit 180.

The delay adjustment unit 100 includes the function of performing delay adjustment on a strobe signal with respect to a data signal during transmission and reception of data between the semiconductor integrated circuit 10 and memory circuit 190. The delay adjustment unit 100 includes an access location conversion unit 110, data saving unit 120, delay element unit 130, delay storage unit 140, and testing unit 150. The delay adjustment unit 100 also includes the function of delay adjustment of a control signal and address signal, in addition to the data signal and strobe signal.

The access location conversion unit 110 includes the function of determining, at the time of testing, a region in which to write data for testing based on instructions from the testing unit 150. The access location conversion unit 110 also includes the function of saving data from the determined region in the data saving unit 120 upon receiving a signal from the testing unit 150 indicating to save data. Furthermore, the access location conversion unit 110 includes the function of storing, in a conversion table 111, the original storage address of data that is saved before testing. The access location conversion unit 110 also includes the function of acquiring, upon completion of testing, the data saved in the data saving unit 120 and restoring the data to the original storage address. Note that when testing is not being performed, the access location conversion unit 110 either transmits a signal received from the memory data transceiver unit 180 to the delay element unit 130 as is, or conversely transmits a signal received from the delay element unit 130 to the memory data transceiver unit 180 as is.

The data saving unit 120 is a memory used to save data located in a memory that stores data during data transmission in the semiconductor integrated circuit 10 when the delay adjustment unit 100 performs delay adjustment. The data saving unit 120 includes the function of saving data output from the access location conversion unit 110 during testing. The data saving unit 120 also includes the function of outputting saved data in response to instructions from the access location conversion unit 110.

The delay element unit 130 includes the functions of transmitting a received data signal as is and of outputting a strobe signal that defines the timing at which to read the data signal, outputting the strobe signal with a delay indicated by the delay storage unit 140. When data is written into the memory circuit 190, the delay element unit 130 outputs a first data signal 133 on a data line and outputs, with a delay, a first strobe signal 134 on the strobe line. When data is read from the memory circuit 190, the delay element unit 130 delays the first strobe signal 134 output from the memory circuit on the strobe line, detects a rising edge of the delayed first strobe signal 134, and reads the first data signal 133 on the data line. The delay element unit 130 also includes the function of delaying other signals as necessary, such as a control signal, address signal, data signal, etc. Details on the delay element unit 130 are provided below.

The delay storage unit 140 includes the functions of storing delays indicating how much to delay the strobe signal and notifying the delay element unit 130 of the delays. The delay storage unit 140 also includes the functions of storing delays indicating how much to delay signals other than the strobe signal and notifying the delay element unit 130 of the delays. The testing unit 150 sets the amount of each delay. Details on the delay storage unit 140 are provided below.

The testing unit 150 includes the function of adjusting delay between the data signal and the strobe signal when conditions are satisfied. The testing unit 150 determines the delay, accesses the memory circuit 190 for testing, and depending on whether data transfer is successful, adjusts the delay. The testing unit 150 accesses the memory circuit 190 at a total of seven different delays that include the current delay and delays that are shifted up or down from the current delay in 10 ps (picoseconds) increments, writing test data to the memory circuit 190 five times at each delay. The testing unit 150 then reads the test data it has written and compares the test data as read and the test data upon writing to determine whether the two pieces of data match. The testing unit 150 then calculates the mean value of the delays at which access during testing was successful all five times, setting the calculated delay as the current delay in the delay storage unit 140. Delay adjustment refers to this process of testing, calculation of the delay, and setting of the calculated delay as the current delay. The testing unit 150 is described below in greater detail.

The first transmission master unit 160 is a Central Processing Unit (CPU) or Direct Memory Access Controller (DMAC) and includes the function of data transfer with the memory 190. The first transmission master unit 160 performs memory access to the memory circuit 190 via the arbitration unit 170, second control line signal 161, second address signal 162, second data signal 163, etc. The second control line signal 161 is a signal indicating the type of data access (read/write). The second address signal 162 is a signal indicating the address of access to the memory circuit 190. The second data signal 163 is the signal of data that is actually written or read. Hereinafter, regardless of ordinal number, the control line signal, address signal, and data signal have the above meanings. In other words, any control line signal defines the type of memory access, any address signal indicates the address of the memory circuit 190, and any data signal is the signal of data that is actually transmitted.

The arbitration unit 170 includes the function of selecting, when a plurality of memory access requests occur, one memory access request in accordance with a predetermined priority ranking. For example, when transmission masters (not shown in the figures) other than the first transmission master unit 160 also perform data transmission with the memory circuit 190, the arbitration unit 170 has the function of previously setting a priority ranking and accepting the access request with a higher priority from among the first transmission master unit 160 and other transmission masters. In Embodiment 1, the arbitration unit 170 receives access requests from the first transmission master unit 160 and the testing unit 150 and prioritizes access by the testing unit 150.

Based on a fourth control line signal 171, fourth address signal 172, and fourth data signal 173, the memory data transceiver unit 180 generates a fifth control line signal 181, fifth address signal 182, fifth data signal 183, and second strobe signal 184. These signals correspond to the first control line signal 131, first address signal 132, first data signal 133, and first strobe signal 134 before the first signals are delayed, the first signals being used when the semiconductor integrated circuit 10 accesses the memory circuit 190. The memory data transceiver unit 180 also exchanges these generated signals with the delay adjustment unit 100.

The memory circuit 190 is electronic circuitry composed of a semiconductor that has the functions of storing data, and of outputting stored data, in response to external requests. Double-Data-Rate Three Synchronous Dynamic Random Access Memory (DDR3-SDRAM) is a representative example of such electronic circuitry. The memory circuit 190 is connected to the semiconductor integrated circuit 10 via the first control line signal 131, first address signal 132, first data signal 133, and first strobe signal 134. The memory circuit 190 includes the function of storing data transmitted from the semiconductor integrated circuit 10 in accordance with the first control line signal 131 output by the semiconductor integrated circuit 10. The memory circuit 190 also includes the function of outputting data indicated by the semiconductor integrated circuit 10 as the first data signal 133 in accordance with the first control line signal 131 output by the semiconductor integrated circuit 10.

Figure 2:
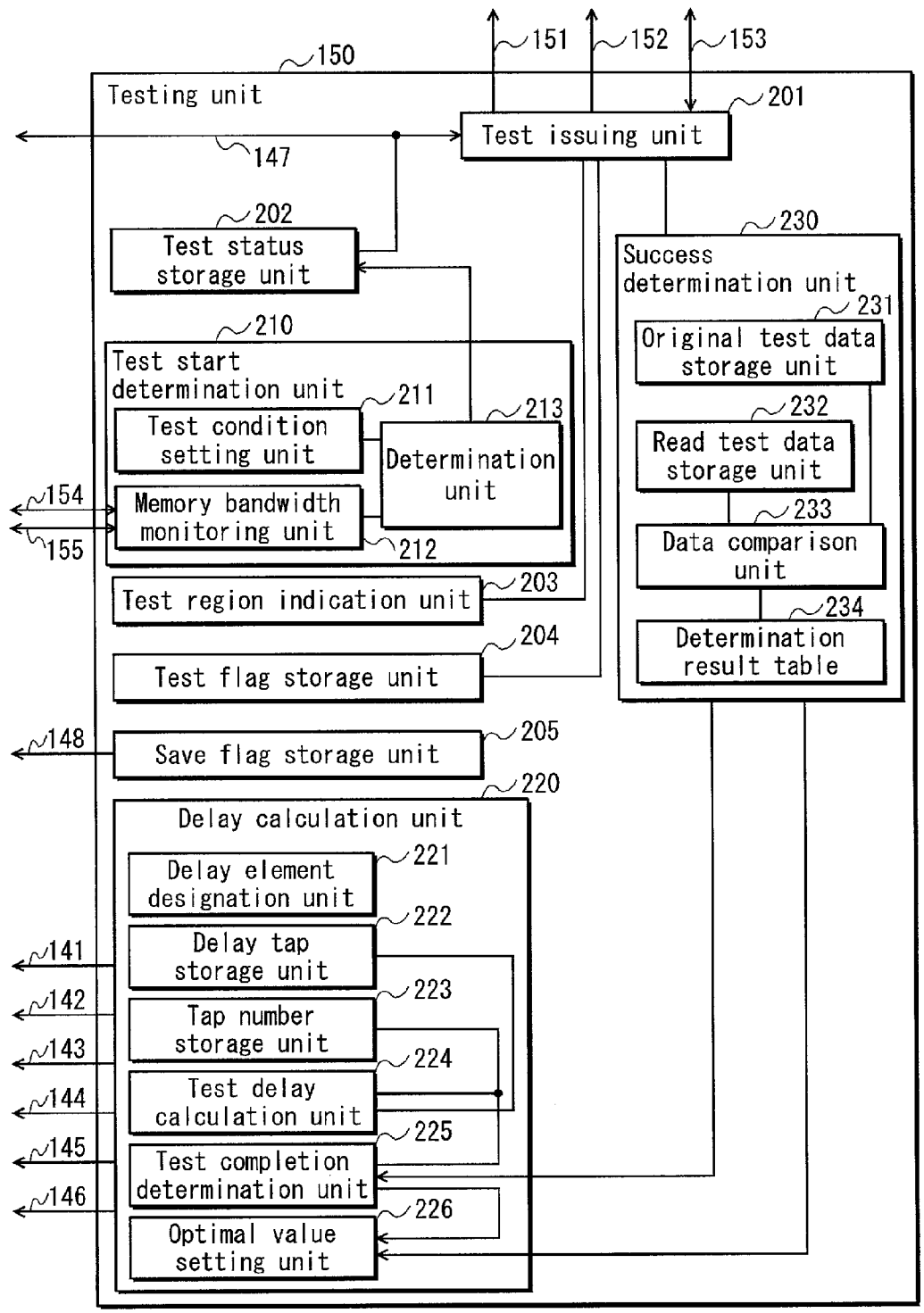
FIG. 2 is a functional block diagram showing the structure of a testing unit according to Embodiment 1.

FIG. 2 is a functional block diagram showing details on the structure of the testing unit 150.

As shown in FIG. 2, the testing unit 150 includes a test issuing unit 201, test status storage unit 202, test region indication unit 203, test flag storage unit 204, save flag storage unit 205, test start determination unit 210, delay calculation unit 220, and success determination unit 230.

The test issuing unit 201 includes the function of issuing a request for testing when a signal from the test status storage unit 202 that indicates operating status changes from "0" to "1". The test issuing unit 201 indicates reading/writing of data via a control line signal 151, indicates the address of access to the memory circuit 190 via an address signal 152, and both transmits test data for determining success, i.e. original test data, and test data read from the memory circuit 190 via a data signal 153. During testing, the test issuing unit 201 issues an access request to write original test data stored in an original test data storage unit 231 in the success determination unit 230. Upon receiving notification that access in the access request is complete, the test issuing unit 201 then issues an access request to read the data that has been written. The test issuing unit 201 transmits, to the success determination unit 230, read test data transmitted from the memory circuit 190 in response to this access request. The test issuing unit 201 both outputs the original test data and receives the read test data from the memory circuit 190 via the data signal 153.

The test status storage unit 202 includes the function of storing information indicating the status of testing in the semiconductor integrated circuit 10. Statuses include the following:
- testing in progress/reading of original test data stored in the original test data storage unit 231 used by the success determination unit 230,
- testing in progress/testing with changed delay,
- testing in progress/writing to memory circuit 190 for testing,
- testing in progress/memory access by system, such as by first transmission master unit 160.

Note that the value of the test status storage unit 202 can be directly set by the system user and can be also set by a signal such as a test start request signal from the test start determination unit 210. When outputting a signal indicating the start of testing, the test start determination unit 210 stores information indicating that testing is in progress. When this information is stored, the test issuing unit 201 issues an access request for testing.

The test region indication unit 203 includes a function to indicate the address of the memory region in which the semiconductor integrated circuit 10 stores original test data read from the memory circuit 190 for delay adjustment. The test region indication unit 203 also includes the function of notifying the test issuing unit 201 of this address.

The test flag storage unit 204 includes the functions of storing a flag indicating whether testing is in progress and of notifying the test issuing unit 201 of the flag. The information stored by the test flag storage unit 204 is one bit of data. A value of "0" indicates normal operation, and a value of "1" indicates that testing is in progress.

The save flag storage unit 205 includes the functions of storing a flag indicating whether data is to be saved in the data saving unit 120 and of notifying the delay storage unit 140 of the flag. If data is already stored in the region indicated by the test region indication unit 203, the value of data stored by the save flag storage unit 205 is "1", indicating that data is to be saved in the data saving unit 120. Otherwise, the value is "0".

The test start determination unit 210 includes the functions of determining whether it is time for testing and of notifying the test status storage unit 202 when determining that testing is to be performed. Specifically, the test start determination unit 210 includes a test condition setting unit 211, memory bandwidth monitoring unit 212, and determination unit 213.

The test condition setting unit 211 includes the functions of setting and storing conditions for determining when to perform testing. These conditions can be set by, for example, a numerical value from a PC to which the semiconductor device 1 is connected or a DIP switch provided on the semiconductor device 1. The test condition setting unit 211 includes the function of storing, as a condition for starting testing, a condition indicating that the memory bandwidth in use is equal to or less than a predetermined threshold. The test condition setting unit 211 also includes the function of notifying the determination unit 213 of this condition.

The memory bandwidth monitoring unit 212 includes the functions of monitoring the first data signal 133 to monitor the memory bandwidth in use and of regularly (e.g. once per minute) notifying the determination unit 213 of the memory bandwidth in use.

The determination unit 213 includes the function of determining whether the memory bandwidth in use as notified by the memory bandwidth monitoring unit 212 satisfies the condition notified by the test condition setting unit 211. The determination unit 213 also includes the function of notifying the test status storage unit 202 of transition to testing when determining affirmatively, i.e. determining that the condition is satisfied.

The delay calculation unit 220 includes the function of calculating a new delay from the results obtained by testing. The delay calculation unit 220 includes a delay element designation unit 221, delay tap storage unit 222, tap number storage unit 223, test delay calculation unit 224, test completion determination unit 225, and optimal value setting unit 226.

The delay element designation unit 221 includes the function of outputting a signal indicating which delay storage unit in the delay storage unit 140 to use.

The delay tap storage unit 222 includes the function of storing an amount of delay for delaying once. In the present Embodiment, the delay tap storage unit 222 stores a delay of 10 ps. In other words, delay adjustment is performed in 10 ps increments.

The tap number storage unit 223 includes the function of storing a number specifying how many times to shift the delay during testing. For example, when the tap number storage unit 223 stores the number "three", testing is performed at the current delay and at delays respectively increased and decreased by the delay stored in the delay tap storage unit 222. In Embodiment 1, the tap number storage unit 223 stores a tap number of "seven". Since the delay stored by the delay tap storage unit 222 is 10 ps, testing is therefore performed at a total of seven different delays: "current delay−30 ps", "current delay−20 ps", "current delay−10 ps", "current delay", "current delay+10 ps", "current delay+20 ps", and "current delay+30 ps".

The test delay calculation unit 224 includes the function of determining how much to change the current delay and of notifying the delay storage unit 140 of the delay used during testing. This delay is determined based on the delay stored by the delay tap storage unit 222 and the tap number stored by the tap number storage unit 223 and is used as the delay for testing that has not yet been performed.

The test completion determination unit 225 includes the function of determining whether or not testing is complete by whether or not the memory circuit 190 has been accessed for testing a predetermined number of times (five times in Embodiment 1) at each of the delays as indicated by the tap number in the tap number storage unit 223. The test completion determination unit 225 also includes the function of notifying the optimal value setting unit 226 when testing is complete.

Upon being notified of completion of testing by the test completion determination unit 225, the optimal value setting unit 226 includes the function of acquiring a determination result table 234 stored by the success determination unit 230.

The optimal value setting unit 226 also includes the functions of calculating an optimal delay based on the determination result table 234 and setting the optimal delay in the delay storage unit 140.

The success determination unit 230 includes the functions of determining whether tests performed by the testing unit 150 succeeded, of storing information indicating the result of this determination, and of notifying the delay calculation unit 220 of this information.

The success determination unit 230 includes the original test data storage unit 231, a read test data storage unit 232, a data comparison unit 233, and the determination result table 234.

The original test data storage unit 231 includes the function of storing original test data to be written in the memory circuit 190 during testing. The original test data may be any data having a specified pattern and formatted to be writable in the memory circuit 190. For example, data such as 0x5a5a5a5a is acceptable, as is four-bit or eight-bit numerical data. The original test data storage unit 231 also includes the function of notifying the data comparison unit 233 of the stored original test data. The original test data is set previously.

The read test data storage unit 232 includes the function of reading original test data that has been written once in the memory circuit 190 and storing this data. The read test data storage unit 232 stores data transmitted from the test issuing unit 201. The read test data storage unit 232 also includes the functions of storing data read during each test (hereinafter also referred to as "read test data") and of outputting the stored read test data to the data comparison unit 233 each time this stored read test data is updated.

The data comparison unit 233 determines whether the original test data output by the original test data storage unit 231 and the read test data output by the read test data storage unit 232 match. A match indicates that data transmission at the current delay of the strobe signal was successful. Conversely, a non-match indicates failure of data transmission, i.e. that the current delay of the strobe signal interferes with data transmission. When the original test data and the read test data match, the data comparison unit 233 registers, in correspondence with the delay during testing, information in the determination result table 234 indicating that data transmission was successful. When the pieces of data do not match, the data comparison unit 233 registers, in correspondence with the delay during testing, information in the determination result table 234 indicating that data transmission failed.

The determination result table 234 is information indicating the success or failure of tests when the optimal value setting unit 226 calculates the optimal delay. FIG. 6 is a data conceptual diagram showing an example data structure of the determination result table 234.

As shown in FIG. 6, the determination result table 234 is information indicating the success or failure of testing at each delay. This table associates delays 601 of the strobe signal with success indicators 602. In the present Embodiment, tests are performed five times at each of the delays, and an indication of success or failure is registered for each test. In the determination result table 234 in FIG. 6, a circle indicates successful transfer of data, and an x indicates failure.

For example, in FIG. 6, testing at "current delay−10 ps", i.e. when the strobe signal rises 10 ps earlier than the current setting, data transfer failed only once, during the third test. In the case of the determination result table 234 shown in FIG. 6, "current delay+10 ps", i.e. when the strobe signal rises 10 ps later than the current setting, is set in the delay storage unit 140 as the new delay, since this value is the mean of when all of the tests were successful: "current delay", "current delay+ 10 ps", and "current delay+20 ps".

Figure 3:
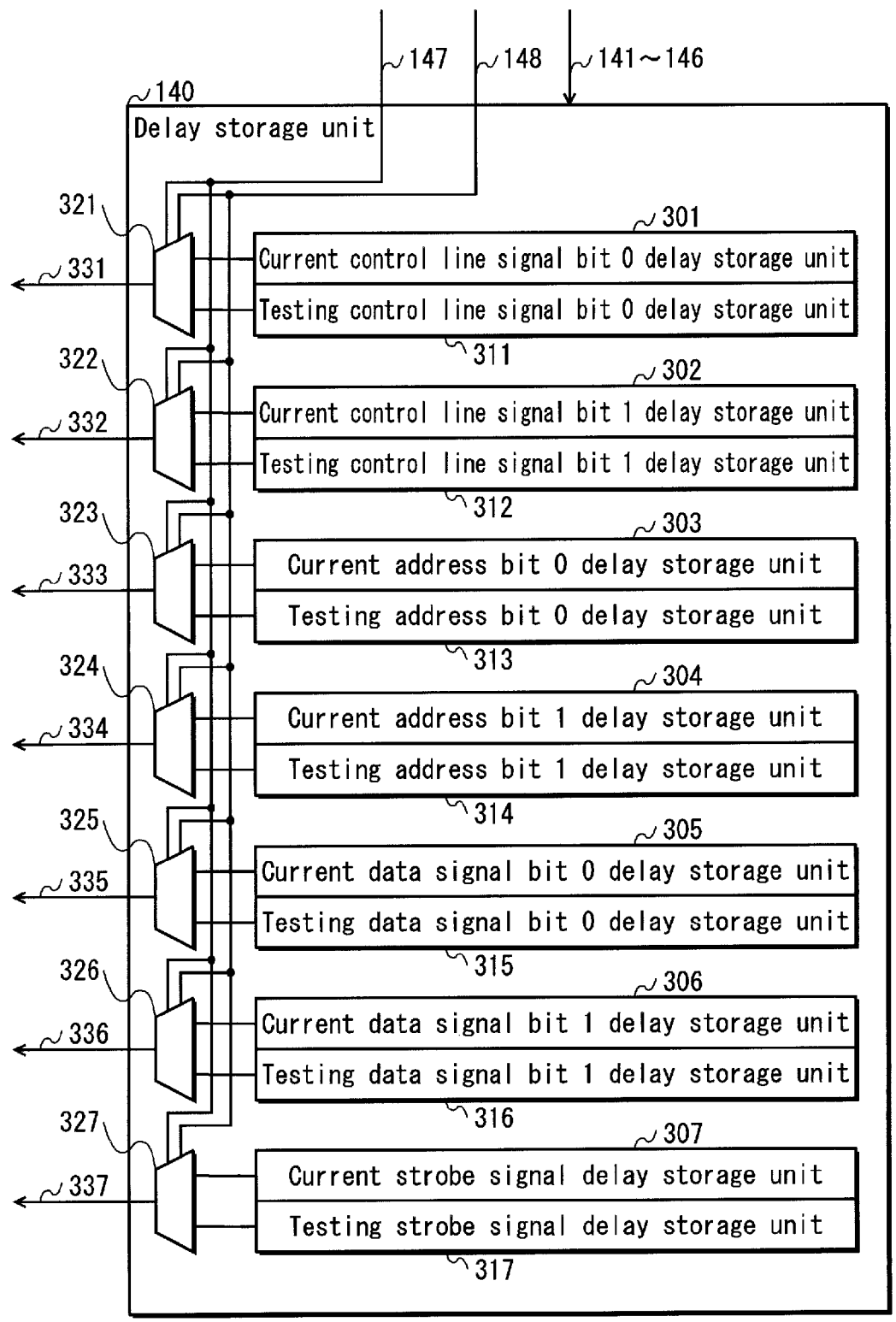
FIG. 3 is a functional block diagram showing the structure of a delay storage unit according to Embodiment 1.

FIG. 3 is a functional block diagram showing the structure of a delay storage unit 140.

As shown in FIG. 3, the delay storage unit 140 includes a current control line signal bit 0 delay storage unit 301, current control line signal bit 1 delay storage unit 302, current address bit 0 delay storage unit 303, current address bit 1 delay storage unit 304, current data signal bit 0 delay storage unit 305, current data signal bit 1 delay storage unit 306, current strobe signal delay storage unit 307, testing control line signal bit 0 delay storage unit 311, testing control line signal bit 1 delay storage unit 312, testing address bit 0 delay storage unit 313, testing address bit 1 delay storage unit 314, testing data signal bit 0 delay storage unit 315, testing data signal bit 1 delay storage unit 316, testing strobe signal delay storage unit 317, and selectors 321-327.

The current control line signal bit 0 delay storage unit 301 includes the functions of storing a delay by which to delay a signal on the signal line for bit 0 of the control line signal currently in use, and of outputting the delay to the selector 321. When testing is complete, the delay stored by the current control line signal bit 0 delay storage unit 301 is updated to the new delay by the testing unit 150.

The testing control line signal bit 0 delay storage unit 311 includes the functions of storing a delay by which to delay a signal on the signal line for bit 0 of the control line signal used during testing, and of outputting the delay to the selector 321. When testing is performed, the delay stored by the testing control line signal bit 0 delay storage unit 311 is updated by the testing unit 150 for each change in delay.

When a signal that indicates the delay element unit output by the delay element designation unit 221 indicates the control line signal bit 0, then based on a signal 147 output by the test status storage unit 202 to indicate whether testing is in progress, the selector 321 selects, in accordance with instructions from the testing unit 150, one of a signal output from the current control line signal bit 0 delay storage unit 301 and the testing control line signal bit 0 delay storage unit 311, outputting the selected signal to the delay element unit 130. Specifically, when the signal output by the test status storage unit 202 indicates that testing is in progress, the selector 321 selects the delay stored by the testing control line signal bit 0 delay storage unit 311. Otherwise, the selector 321 outputs the delay stored by the current control line signal bit 0 delay storage unit 301.

Other current delay storage units (302-307), testing delay storage units (312-317), and selectors (322-327) simply control different lines and delays, outputting the delays of signals corresponding to the names of the units. Details, therefore, are omitted.

Figure 4:
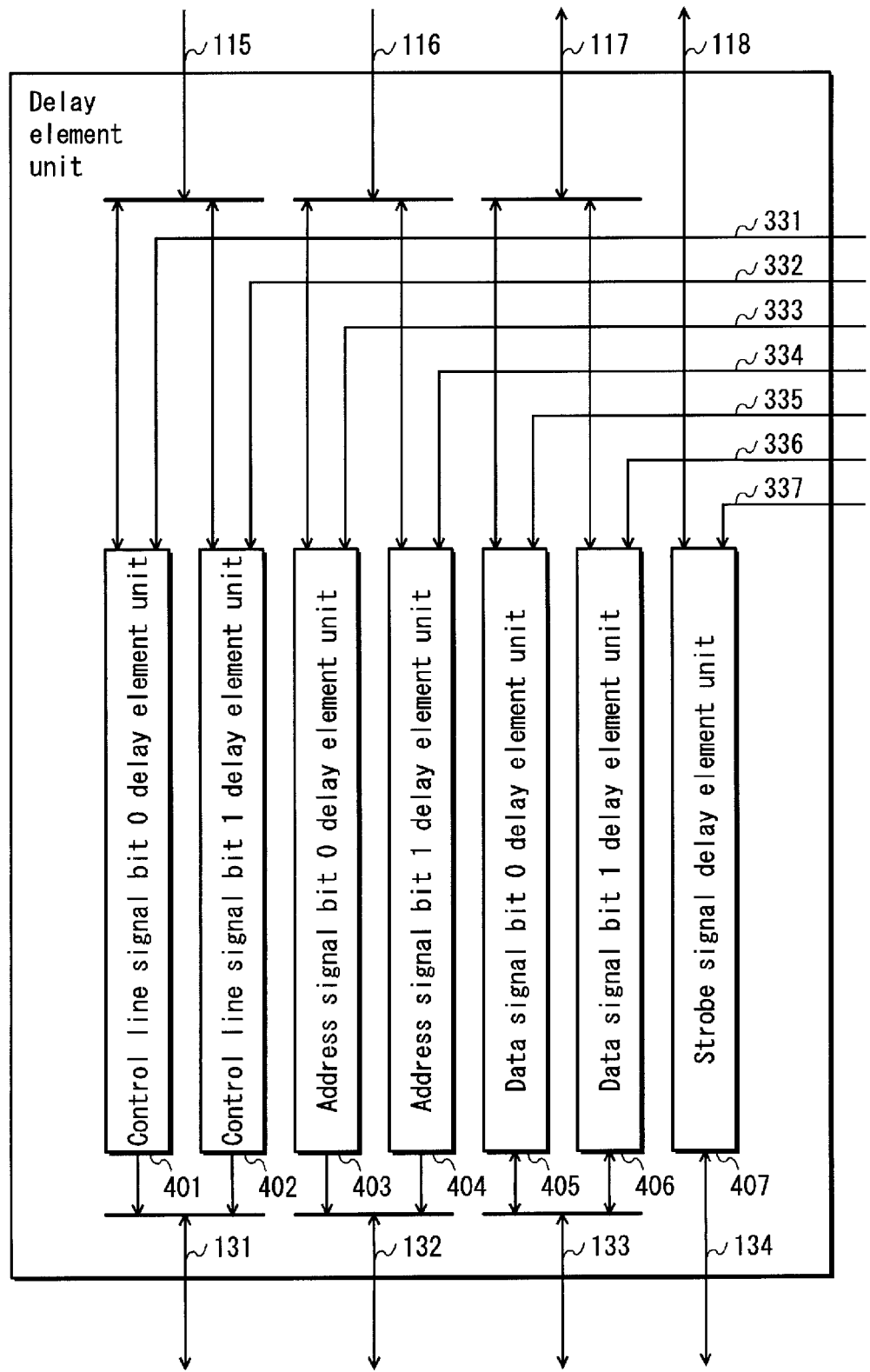
FIG. 4 is a functional block diagram showing the structure of a delay element unit according to Embodiment 1.

FIG. 4 is a functional block diagram showing the structure of a delay element unit 130.

As shown in FIG. 4, the delay element unit 130 includes a control line signal bit 0 delay element unit 401, control line signal bit 1 delay element unit 402, address signal bit 0 delay element unit 403, address signal bit 1 delay element unit 404, data signal bit 0 delay element unit 405, data signal bit 1 delay element unit 406, and strobe signal delay element unit 407.

The control line signal bit 0 delay element unit 401 includes the function of delaying the signal of the $0^{th}$ bit of the control signal.

The control line signal bit 1 delay element unit 402 includes the function of delaying the signal of the $1^{st}$ bit of the control signal.

The address signal bit 0 delay element unit 403 includes the function of delaying the signal of the $0^{th}$ bit of the address signal.

The address signal bit 1 delay element unit 404 includes the function of delaying the signal of the $1^{st}$ bit of the address signal.

The data signal bit 0 delay element unit 405 includes the function of delaying the signal of the $0^{th}$ bit of the data signal.

The data signal bit 1 delay element unit 406 includes the function of delaying the signal of the $1^{st}$ bit of the data signal.

The strobe signal delay element unit 407 includes the function of delaying the strobe signal.

Each delay element unit delays an input signal by the delay (331-337) that is output by the corresponding delay storage unit in the delay storage unit 140. Each delay element then outputs the delayed signal.

In the present Embodiment, delay is adjusted between the data signal and the strobe signal, and the crucial structure for this delay adjustment is the strobe signal delay element unit 407. However, by providing the control line signal bit 0 delay element unit 401, control line signal bit 1 delay element unit 402, address signal bit 0 delay element unit 403, and address signal bit 1 delay element unit 404, any misalignment occurring between, for example, the address signal 0 bit and address signal 1 bit can be adjusted. A problem wherein the correct address is not transmitted due to misalignment occurring between address signals can thus be resolved.

Figure 5:
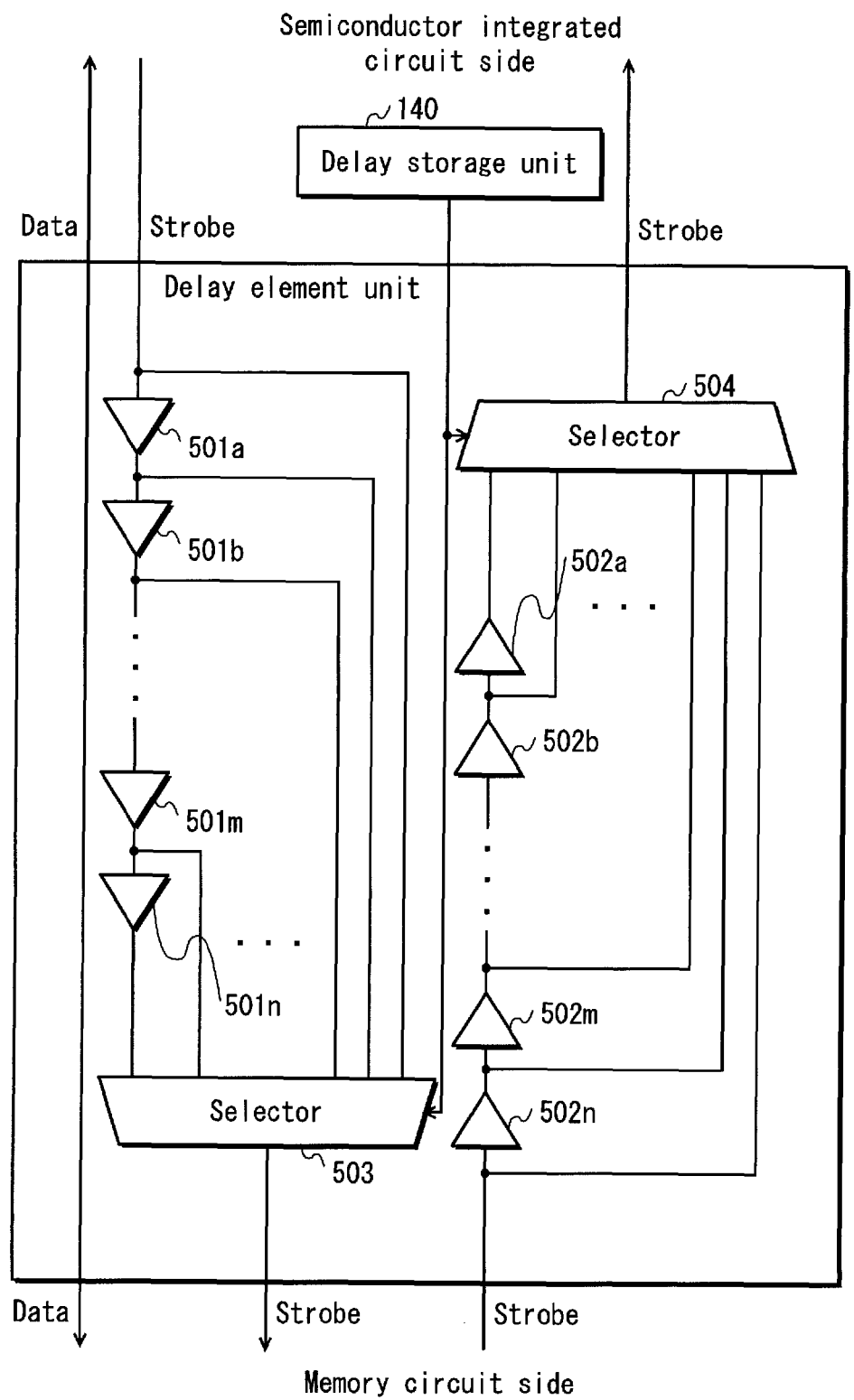
FIG. 5 is a block diagram showing the circuit structure of the delay element unit according to Embodiment 1.

FIG. 5 is a block diagram showing details on the circuit structure of the strobe signal delay element unit 407.

The strobe signal delay element unit 407 is provided with a structure that outputs the strobe signal when the semiconductor integrated circuit writes data into the memory circuit 190 and when data is read from the memory circuit 190.

As shown in FIG. 5, the strobe signal delay element unit 407 includes transmission delay elements (501a-501n), reception delay elements (502a-502n), and selectors 503 and 504. Note that the number of delay elements necessary for shifting the delay is provided, and the letter n refers to this necessary number. For example, the number of delay elements provided at least corresponds to the time the data signal is on the data line divided by the amount of delay of a delay element.

Each delay element (501a-501n, 502a-502n) is, for example, a latch circuit and includes the function of delaying an input signal by 10 ps.

The selector 503 includes the functions of selecting an output signal indicated by the delay element designation unit in the delay storage unit 140 and of outputting the selected signal. The selector 503 outputs a strobe signal from the semiconductor integrated circuit 10 to the memory circuit 190.

The selector 504 includes the functions of selecting an output signal indicated by the delay element designation unit in the delay storage unit 140 and of outputting the selected signal. The selector 504 outputs a strobe signal from the memory circuit 190 to the semiconductor integrated circuit 10.

Note that other delay elements have approximately the same circuit structure, and therefore a description thereof is omitted. Note however that since the strobe signal is transmitted in two directions, a structure for transmission in both directions needs to be provided. Since the control line signal and address signal are only transmitted from the semiconductor integrated circuit 10 to the memory circuit 190, only delay elements and a selector for transmission from the semiconductor integrated circuit 10 to the memory circuit 190 need be provided.

<Operations>

Figure 7:
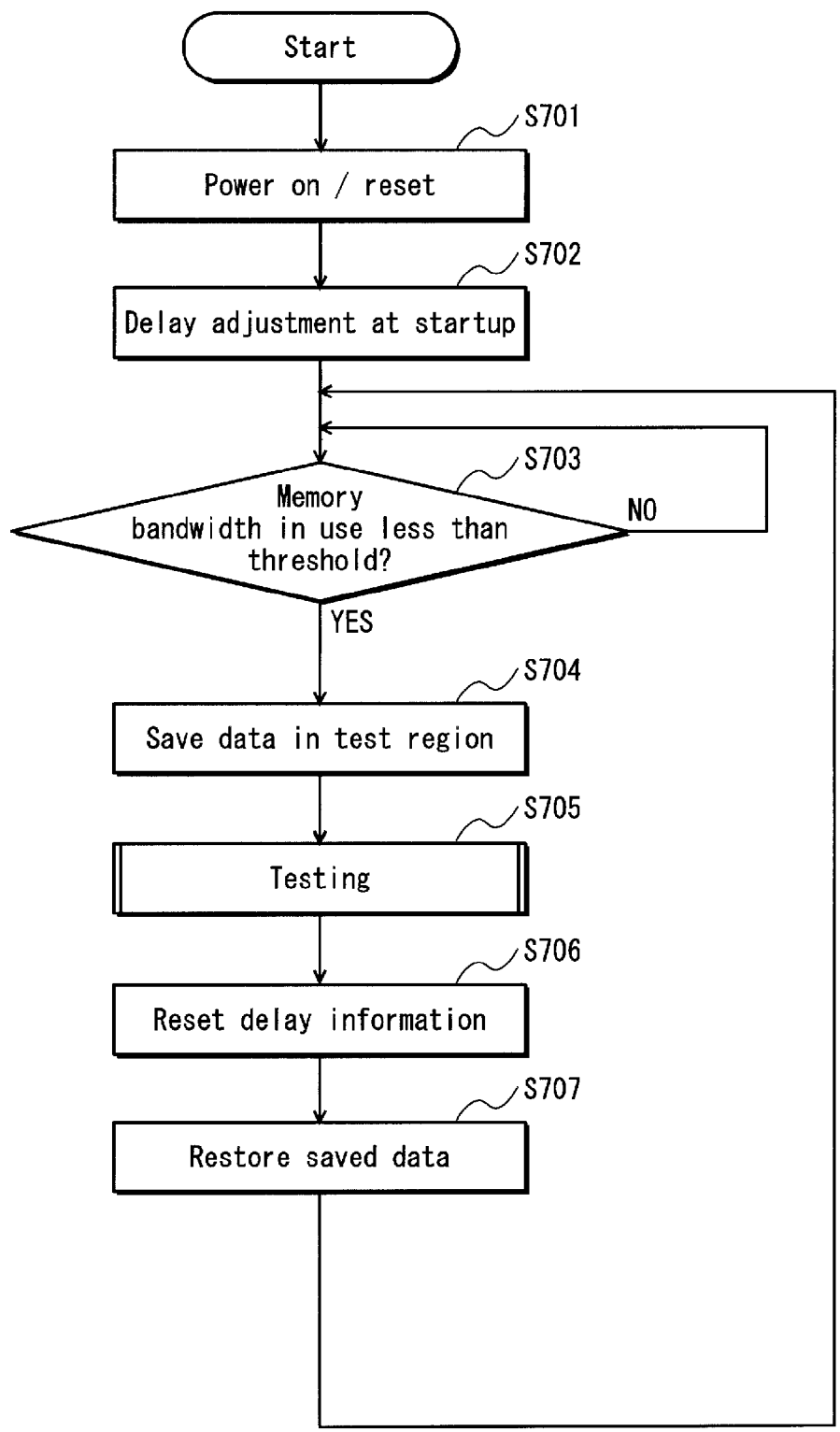
FIG. 7 is a flowchart showing delay adjustment by a delay adjustment unit according to Embodiment 1.

FIG. 7 is a flowchart showing delay adjustment by the delay adjustment unit 100.

The semiconductor device 10 is initialized by the power being turned on or by a system reset (step S701).

The delay adjustment unit 100 then performs delay adjustment at the time of system startup (step S702). This delay adjustment may set the delay to a previously determined initial value or may perform the testing described below.

The memory bandwidth monitoring unit 212 in the testing unit 150 detects a memory bandwidth that is in use at any given time and notifies the determination unit 213 of the detected memory bandwidth. The determination unit 213 regularly (e.g. once per minute) determines whether this memory bandwidth is below a threshold previously set in the test condition setting unit 211 (step S703).

If the memory bandwidth in use is equal to or greater than a predetermined threshold (step S703: NO), processing simply returns to step S703.

If the memory bandwidth in use is below the predetermined threshold (step S703: YES), and when the information stored in the save flag storage unit 205 indicates use of the data saving unit 120, the access location conversion unit 110 saves, in the data saving unit 120, data stored in the region of memory used during testing (step S704). At this point, the test status storage unit 202 stores information indicating that testing is in progress.

After saving data as necessary, the testing unit 150 in the delay adjustment unit 100 is triggered by the test status storage unit 202 storing information indicating that testing is in progress and performs testing related to delay adjustment (step S705). Details on testing are provided below with reference to FIG. 8.

The delay calculation unit 220 in the testing unit 150 uses the results obtained by testing and sets a calculated delay as the current delay in the delay storage unit 140 (step S706).

After completion of testing, the access location conversion unit 110 refers to the conversion table 111 to restore the data saved in the data saving unit 120 due to testing to the original address of the data (step S707). Processing then returns to step S703.

By repeating the processing in steps S703-S707, delay adjustment is performed when the memory bandwidth in use is low. Delay adjustment is thus performed even during system operation, and therefore it is possible to correct misalignment between the data signal and the strobe signal occurring due to changes in temperature, degradation over time, etc. produced by system operation.

Figure 8:
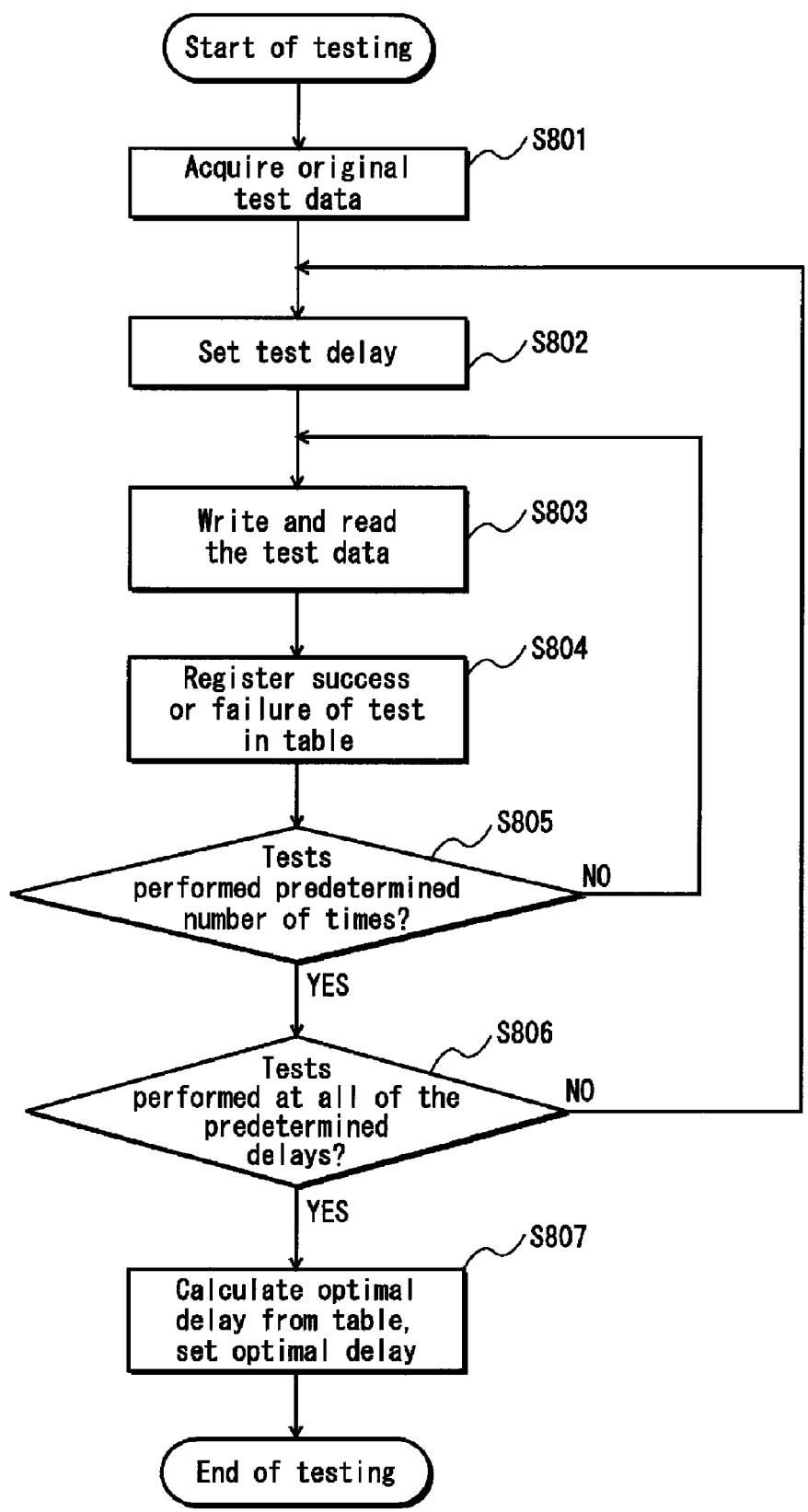
FIG. 8 is a flowchart showing operations of the delay adjustment unit during testing.

FIG. 8 is a flowchart showing detailed operations of the testing unit 150 during testing in step S705 of the flowchart in FIG. 7.

The test issuing unit 201 acquires original test data from the success determination unit 230 (step S801).

The delay calculation unit 220 determines how much to shift the delay from the current delay and sets the delay used during testing in the delay storage unit 140 (step S802). Specifically, the delay element designation unit 221 outputs information indicating the strobe signal, the test status storage unit 202 outputs information indicating that testing is in progress, and the delay calculation unit 220 outputs the delay at that point. The delay output by the delay calculation unit 220 is set in the testing strobe signal delay storage unit in the delay storage unit 140. The selector 327 selects the delay and outputs the delay to the delay element unit 130 as a signal 337. The strobe signal delay element unit 407 in the delay element unit 130 thus delays the input strobe signal by the delay and outputs the delayed strobe signal.

The test issuing unit 201 issues an access request to the arbitration unit 170 to write the acquired original test data in the memory circuit 190. Upon receiving an access request indicating testing, the arbitration unit 170 prioritizes the access request and transmits it to the memory data transceiver unit 180. The memory circuit 190 is then accessed to write the original test data.

Upon receiving a signal indicating completion of writing from the memory circuit 190, the test issuing unit 201 next issues an access request to read the original test data that is expected to have been written in the memory circuit 190. The read test data that is output from the memory circuit 190 in response to this access request is written into the read test data storage unit 232 via the test issuing unit 201 (step S803).

The data comparison unit 233 determines whether a test succeeded or failed based on whether the original test data output by the original test data storage unit 231 and the read test data output by the read test data storage unit 232 match. The data comparison unit 233 registers the success or failure of the test in the determination result table 234 (step S804).

The delay calculation unit 220 determines whether tests at the current delay have been performed the predetermined number of times (in this Embodiment, five times; step S805). This delay calculation unit 220 makes this determination by counting the number of times it has performed tests, storing the count, and checking whether the count has reached the predetermined number of times.

If tests have not been performed the predetermined number of times (step S805: NO), processing returns to step S803. Otherwise (step S805: YES), the test completion determination unit 225 determines whether tests have been performed for all of the predetermined delays based on whether the delay has been changed a number of times equal to the tap number stored in the tap number storage unit 223 (step S806).

If tests have not been performed the predetermined number of times (step S806: NO), processing returns to step S802. Otherwise (step S806: YES), the test completion determination unit 225 notifies the optimal value setting unit 226 that tests have been performed the predetermined number of times. Having received notification, the optimal value setting unit 226 acquires the determination result table 234 from the success determination unit 230.

The optimal value setting unit 226 searches the acquired determination result table 234 for delays for which all tests were successful. The optimal value setting unit 226 then calculates the mean of the delays for which all tests were successful as an optimal delay and sets the calculated delay in the current strobe signal delay storage unit in the delay storage unit 140 (step S807). Testing is thus complete.

By operating in the above way, the delay adjustment unit 100 adjusts misalignment between the data signal and the strobe signal even when the system is operating, i.e. at times other than initialization or reset.

Embodiment 2

Embodiment 1 describes performing delay adjustment when the memory bandwidth in use falls below a predetermined threshold. However, if the semiconductor integrated circuit 10 and the memory circuit 190 continually transfer data at or above the predetermined threshold, then the semiconductor device 1 illustrated in Embodiment 1 may not be able to perform delay adjustment.

Embodiment 2 thus discloses a semiconductor device 2 that is provided with a delay adjustment unit to address such a situation.

<Structure>

Figure 9:
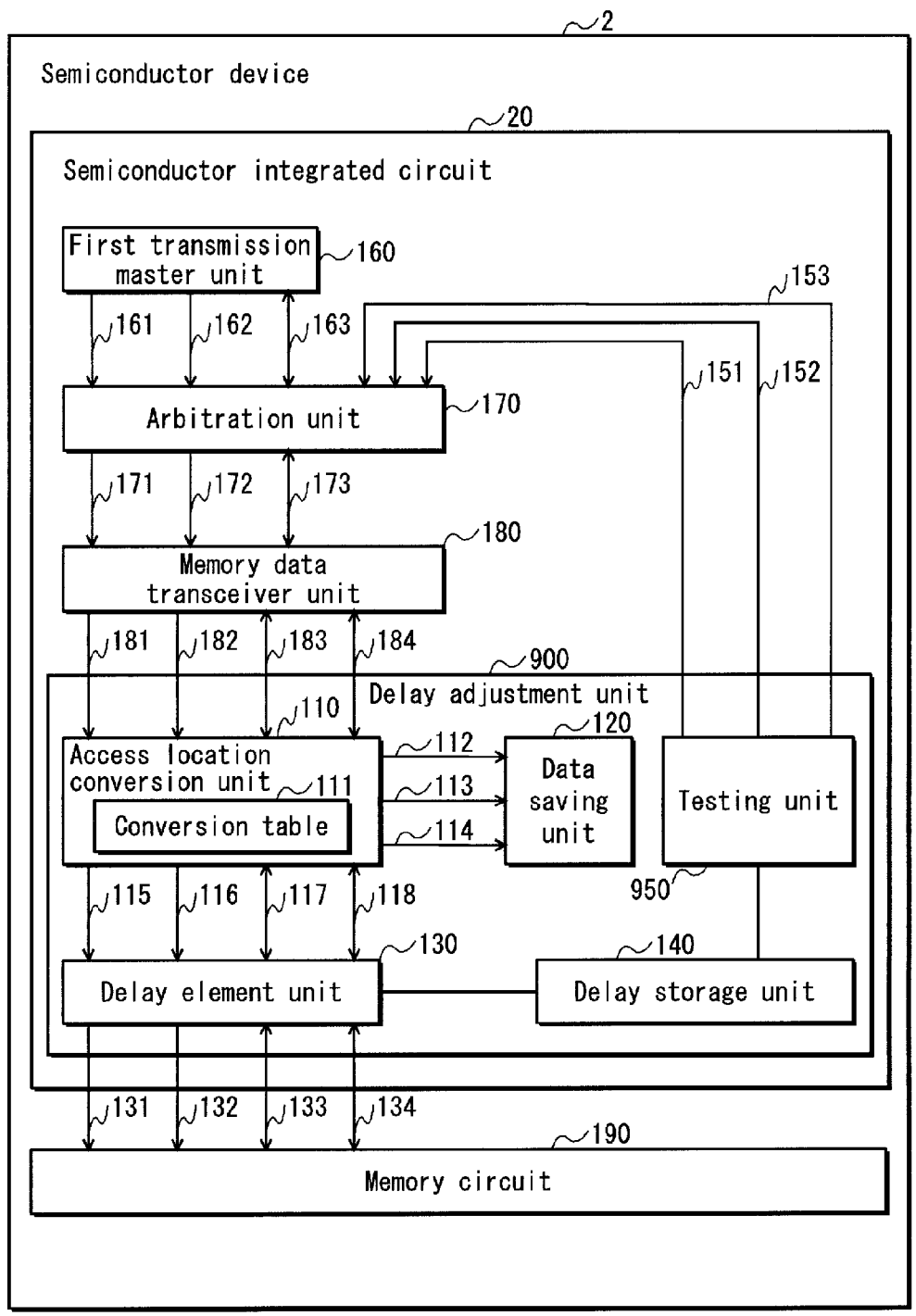
FIG. 9 is a functional block diagram showing the structure of a semiconductor device according to Embodiment 2.
Figure 10:
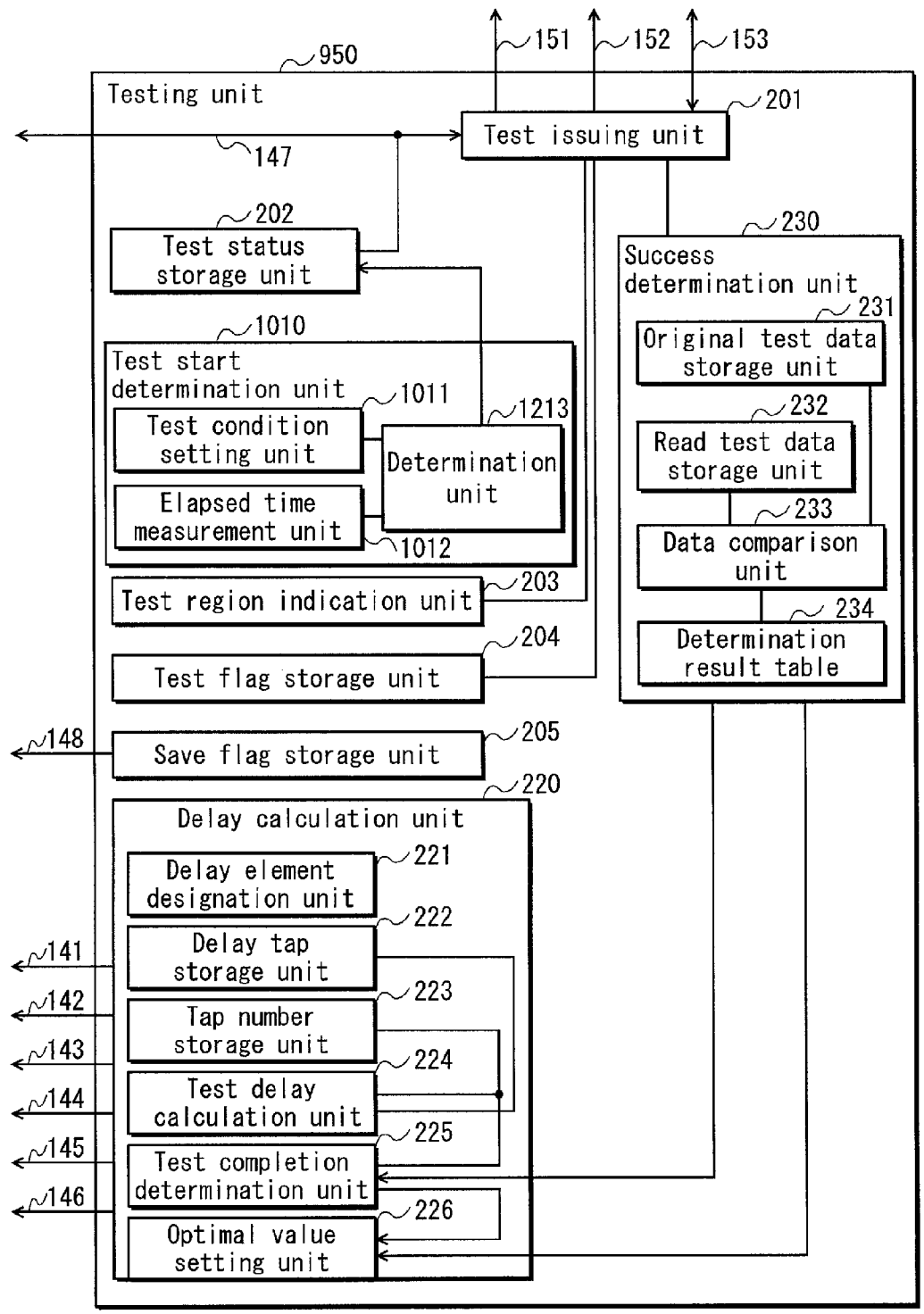
FIG. 10 is a functional block diagram showing the structure of a testing unit according to Embodiment 2.

FIG. 9 is a functional block diagram showing the structure of the semiconductor device 2 according to Embodiment 2, and FIG. 10 is a functional block diagram showing the structure of a testing unit 950 according to Embodiment 2. Unlike Embodiment 1, the semiconductor device 2 according to Embodiment 2 is provided with a delay adjustment unit 900. The delay adjustment unit 900 differs from the delay adjustment unit 100 illustrated in Embodiment 1 by being provided with a testing unit 950. The testing unit 950 differs from the testing unit 150 by being provided with a test start determination unit 1210 instead of the test start determination unit 210.

Whereas in Embodiment 1, delay is adjusted when the memory bandwidth in use is less than the predetermined threshold value, the testing unit 950 adjusts delay every time a predetermined interval of time elapses after startup of the semiconductor device 2.

As shown in FIG. 10, the test start determination unit 1010 includes a test condition setting unit 1011, elapsed time measurement unit 1012, and determination unit 1213.

The test condition setting unit 1011 includes the functions of storing a condition for performing testing and of notifying the determination unit 1213 of this condition. The condition is passage of a predetermined interval since delay adjustment was last performed.

The elapsed time measurement unit 1012 is a timer for measuring the elapsed time and includes the function of notifying the determination unit 213 of the measured time. The elapsed time measurement unit 1012 resets the measured elapsed time each time testing is performed.

The determination unit 1213 includes the function of determining whether the period of time notified by the test condition setting unit 1011 has elapsed based on the time notified by the elapsed time measurement unit 1012. When the period of time notified by the test condition setting unit 1011 has elapsed, the determination unit 1213 changes the operating status stored by the test status storage unit 202 from normal status to testing in progress.

<Operations>

The following describes operations of the semiconductor device 2 according to Embodiment 2. A description of operations that are the same as in Embodiment 1 is omitted, and only the differences are described.

Figure 11:
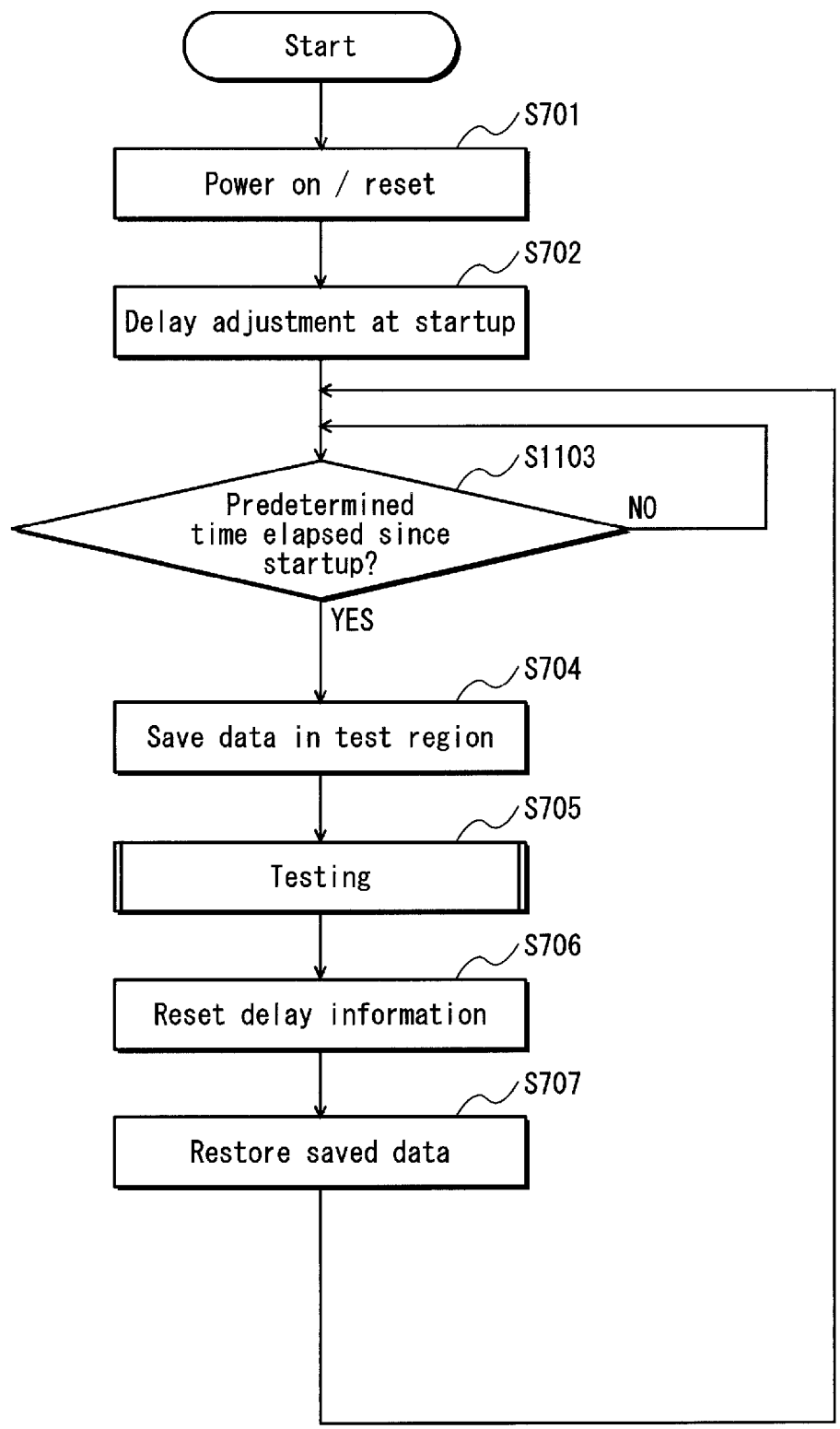
FIG. 11 is a flowchart showing delay adjustment by a delay adjustment unit according to Embodiment 2.

FIG. 11 is a flowchart showing operations of the semiconductor device 2 according to Embodiment 2. In the flowchart shown in FIG. 11, operations with the same step number as in the flowchart in FIG. 7 represent the same operations, and thus a description thereof is omitted.

The differences in the operations of Embodiment 2 are in step S1103 of the flowchart in FIG. 11. In other words, the condition for the start of testing, i.e. for determining to start delay adjustment, differs.

The determination unit 1213 in the test start determination unit 1010 determines whether the period of time set in the test condition setting unit 1011 has elapsed based on the time notified by the elapsed time measurement unit 1012 (step S1103). When a predetermined interval has elapsed (step S1103: YES), delay adjustment, i.e. testing, begins (processing from step S704 on).

Each time the predetermined interval elapses from startup of the semiconductor device 2, the delay adjustment unit 900 thus mandatorily performs delay adjustment. Therefore, misalignment between the data signal and the strobe signal is adjusted even if the semiconductor integrated circuit 20 and the memory circuit 190 continually transfer data, thereby hindering the performance of testing. Furthermore, since data stored in a memory region that is used in testing is first saved in the data saving unit 120, it is possible to restore the data after testing, thereby not impeding system operation.

<Supplementary Explanation>

The above Embodiments describe ways of implementing the present invention, but the present invention is of course not limited to these Embodiments. Apart from the above Embodiments, the following describes Modifications that are included in the present invention.

(1) In Embodiments 1 and 2, delay adjustment is performed respectively when the memory bandwidth is equal to or less than a predetermined threshold or every time a predetermined time interval elapses. These two Embodiments may be combined, however, and the delay adjustment unit may perform delay adjustment in both of these cases. In other words, the memory bandwidth may be monitored to perform delay adjustment when the memory bandwidth is equal to or less than the predetermined threshold while also mandatorily performing delay adjustment every time the predetermined interval elapses. With this structure, the probability of misalignment occurring between the data signal and the strobe signal, leading to failure of data transmission, is reduced more than when only performing delay adjustment during one of the above two conditions.

(2) In Embodiment 1, when the memory bandwidth in use is less than a predetermined threshold, testing is always performed. However, testing need not always be performed. For example, a structure may be adopted in which testing is not performed until after a predetermined interval passes after delay adjustment is performed. This structure lessens the processing burden on the semiconductor integrated circuit 10.

(3) In the above Embodiments, the first transmission master unit 160 outputs a data signal and a strobe signal simultaneously and causes the memory circuit 190 to read data by causing the strobe signal delay element unit to output the strobe signal to the memory circuit 190 with a delay.

A structure may be adopted, however, wherein the strobe signal delay element unit is not provided with delay elements for output. Rather, when the first transmission master unit 160 is outputting data, the first transmission master unit 160 may output the strobe signal with a delay of a predetermined time after outputting the data signal.

(4) In the above Embodiments, when determining the delay, testing is performed to determine success or failure of data transfer by shifting the current delay up or down 30 ps, using a total of seven delays in 10 ps increments. As long as data sufficient to determine the delay is acquired, however, determination of success or failure may be made by shifting the current delay up or down 20 ps, using a total of five delays in 10 ps increments, for example. For a smaller number of measured delays, the time needed to determine the delay is reduced, whereas for a larger number, reliability of the determined delay increases.

Furthermore, in the embodiments, success or failure of data transfer is determined for tests performed five times at each delay, but this number is not limited to five. The number may, for example, be one, four, seven, etc. For a smaller number, the time needed to determine the delay is reduced, whereas for a larger number, reliability of the determined delay increases.

In the above Embodiments, success or failure of data transfer is determined by shifting the delay in 10 ps increments. In accordance with the delay of the delay units, however, increments may be 5 ps or 20 ps.

Also, in the above Embodiments, delays at which data transfer succeeded all five times are selected, and the mean value of the delays is used. However, the mean may be calculated after multiplying each delay at which testing is performed by the fraction of the five times that data transfer is successful.

(5) In the above Embodiments, misalignment between the data signal and the strobe signal is recited as occurring depending on the operating status of the system, in particular on operating temperature. Therefore, the following discloses a structure to determine the delay in accordance with temperature. In order to implement this structure, the optimal delay in accordance with the operating temperature of the system is previously measured by a simulation with the actual system. The delay adjustment unit stores the optimal values of delays obtained via the simulation as temperature dependent delay information.

Figure 12:
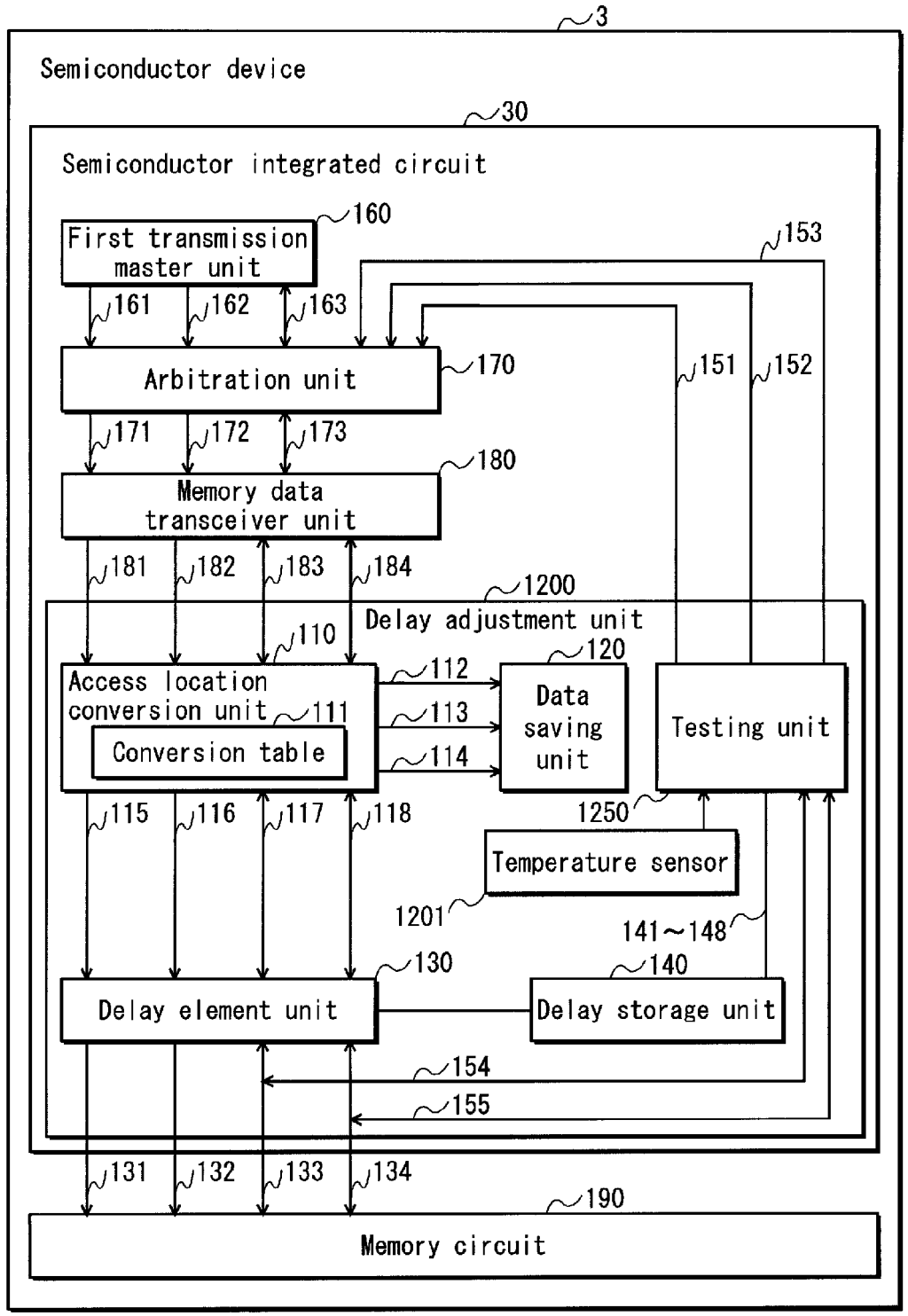
FIG. 12 is a functional block diagram showing a modification of the semiconductor device.

FIG. 12 shows the structure of a semiconductor device that includes such a delay adjustment unit. In addition to the delay adjustment unit in Embodiment 1, the delay adjustment unit 1200 shown in FIG. 12 is further provided with a temperature sensor 1201.

The temperature sensor 1201 includes the function of measuring the surrounding temperature and of regularly (e.g. every 30 seconds) notifying the testing unit 150 of the measured temperature.

Figure 13:
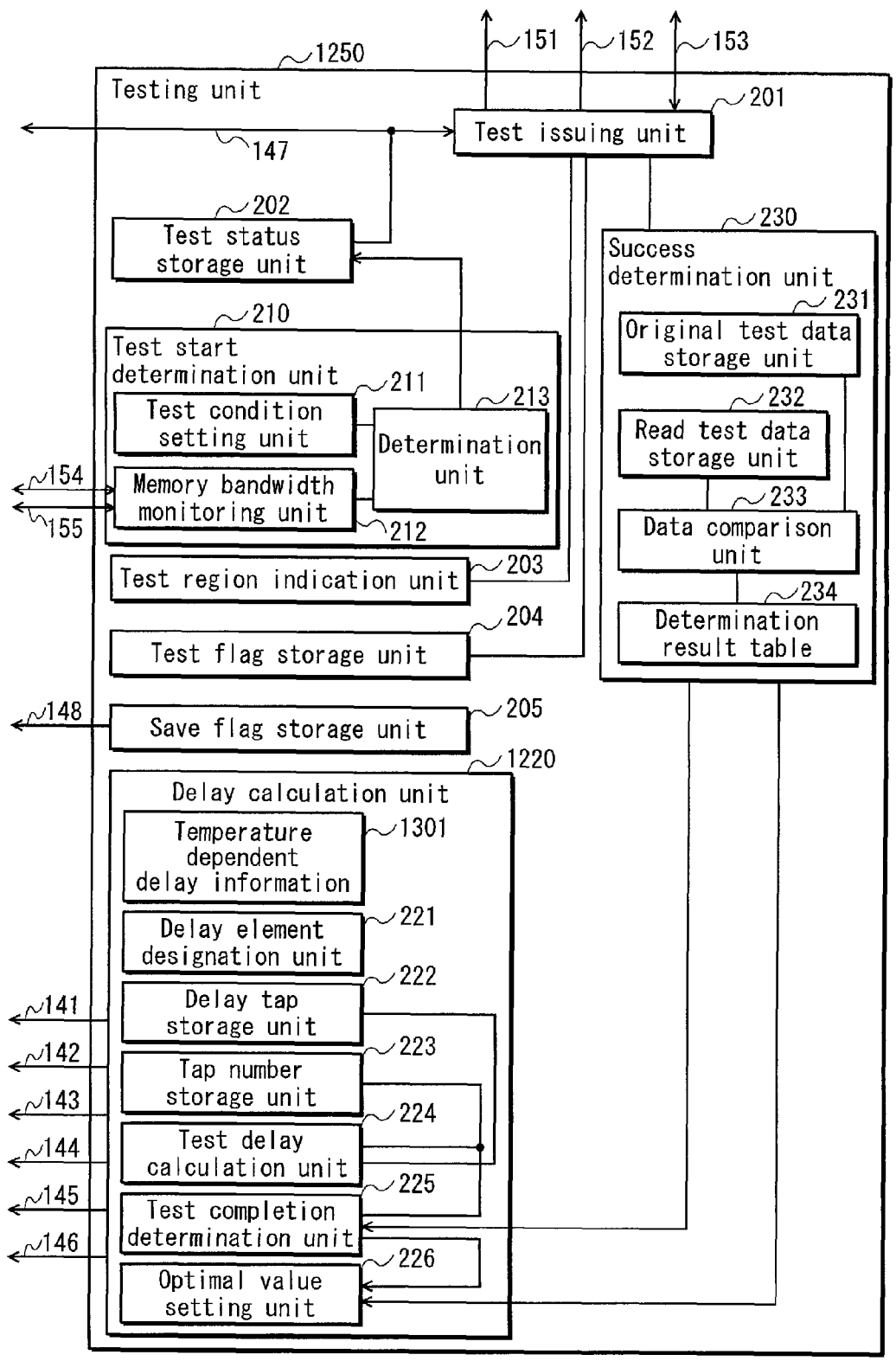
FIG. 13 is a functional block diagram showing a testing unit according to the modification of the semiconductor device.
Figure 15:
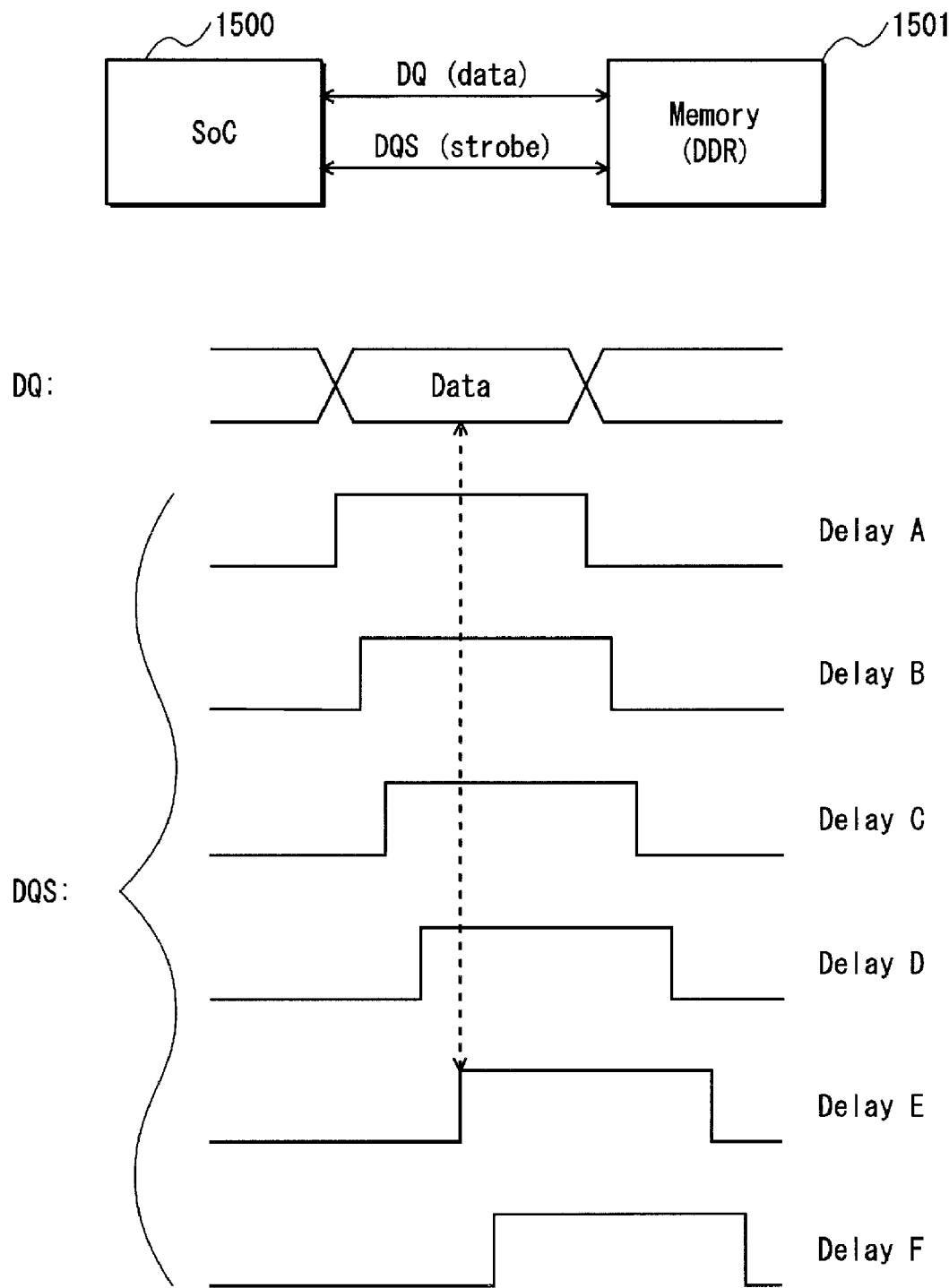
FIG. 15 is an outline of delay adjustment.

As shown in FIG. 13, in addition to the components in the delay calculation unit 220 in Embodiment 1, the delay calculation unit 1220 in the testing unit 1250 stores temperature dependent delay information 1301.

FIG. 14 is an example of a structure of the temperature dependent delay information 1301. FIG. 14 is a data conceptual diagram showing an example of temperature dependent delay information 1301.

As shown in FIG. 14, the temperature dependent delay information indicates temperature ranges 1401 measured by the temperature sensor 1201 and delays at those temperature ranges 1401 for each of the memory bandwidths 1402 used by the system. Note that the values of the delays shown in FIG. 14 are simply examples. The delays will of course vary by system, and optimal delays will be specified in accordance with the provided system. The delays are acquired via an operating simulation, for example, before the semiconductor device 3 is shipped.

In this temperature dependent delay information, the temperature range is either less than 40 degrees or is 40 degrees or greater. The bandwidth is either 1200 Mbps or 2400 Mbps. Note that these values are only examples. The temperature range and the bandwidth may be more finely divided, or the bandwidth may be specified as a predetermined range, such as 1000 Mbps to 2000 Mbps, rather than as a fixed value.

When performing testing, the testing unit 1250 determines a standard delay in accordance with the temperature notified by the temperature sensor 1201.

As described in Embodiment 1, the testing unit 1250 then shifts the standard delay up or down in 10 ps increments in accordance with the tap number and measures the success of data transfer five times at each delay. The mean value of delays for which data transfer was successful all five times is then set as the new delay.

By providing the above structure, an appropriate delay is set for temperature conditions of the system.

Note that the delay adjustment unit 900 shown in Embodiment 2 may also include this structure. The delay shown in the temperature dependent delay information 1301 may also be used as the delay at system startup or after a reset.

When the temperature sensor 1201 is provided, a condition serving as a trigger for testing may be the temperature indicated by the temperature sensor 1201 exceeding a predetermined temperature (for example, 40° C.). In accordance with the operating temperature of the semiconductor integrated circuit 10, misalignment may occur between the data signal and the strobe signal. Such a trigger addresses this problem. Using the temperature of the temperature sensor 1201 as a condition for delay adjustment makes the temperature dependent delay information more useful.

(6) In the delay element unit in the Embodiments, the selectors 503 and 504 select a signal from one delay element and output the selected signal in accordance with the delay indicated by the delay storage unit 140. The following structure, however, may be adopted.

Instead of arranging delay elements in series as shown in FIG. 5, delay elements with differing delays may be arranged in parallel (a delay element that delays the strobe signal by 10 ps, a delay element that delays by 20 ps, . . . , a delay element that delays by 100 ps . . . ). The original test data may be written into different areas in the memory circuit 190 at the timing of the strobe signal output by each of these delay elements. The data in each of the different areas may then be read, and each piece of read test data compared with the original test data to determine the success or failure of data transfer. With the above structure, it is not necessary during testing to perform tests by changing the delay. For example, whereas in Embodiment 1 tests at seven delays are performed five times each for a total of 35 tests, by arranging the delay elements in parallel, only five tests are necessary, thus shortening the time necessary for testing.

(7) The delay in the Embodiments has been described in terms of seconds, but any delay other than seconds that can regulate how much to delay a signal is possible. For example, delay may be regulated by phase (degree). In this case, the delay adjustment unit in the Embodiments would be called a phase adjustment unit, and the delay would become a phase change amount that specifies how many degrees to delay the phase of the strobe signal.

(8) Once testing starts in the Embodiments, testing is performed until completion, and the delay is updated. If the memory bandwidth increases to the predetermined threshold or greater during testing, however, testing may be suspended.

In such a case, data on testing (information indicating at which delays tests have been performed and the success or failure of data transfer for each test) is saved in a location such as memory. After suspension, when the memory bandwidth once again falls below the predetermined threshold, testing is continued from the point of suspension. After suspension of testing, when the memory bandwidth once again falls below the predetermined threshold, testing may also be performed from the start.

(9) In Embodiment 1, the memory bandwidth monitoring unit 212 monitors the memory bandwidth every minute, but monitoring is not limited to once per minute. The frequency of monitoring may be changed in response to the system operating environment, for example to once every 20 seconds, every two minutes, etc.

(10) Each of the functional units in the semiconductor devices 1, 2, and 3 in FIGS. 1, 2, 3, 4, 9, 10, 12, and 13 may be integrated as one or as a plurality of Large Scale Integrations (LSI). A plurality of functional units may also be integrated on one LSI.

Depending on the degree of integration, LSI may be referred to as an Integrated Circuit (IC), system LSI, Very Large Scale Integration (VLSI), Super Large Scale Integration (SLSI), Ultra Large Scale Integration (ULSI), etc.

The method of integration is not limited to LSI, and dedicated circuitry or a general processor may be used. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of function blocks may naturally be accomplished using such technology. The application of biotechnology or the like is possible.

(11) A control program composed of program code may cause a processor in a consumer product or the like, as well as a variety of circuits connected to the processor, to perform operations for delay adjustment, processing to set the delay, etc. (see FIGS. 7 and 8) described in the Embodiments. The control program may be recorded on a recording medium or distributed via a variety of transmission channels (such as networks of which telecommunications networks, wire/wireless communications networks, and the Internet are representative). Such a recording medium includes an IC card, hard disk, optical disc, flexible disk, ROM, etc. The distributed control program is usable by being stored on, for example, a memory readable by a processor. The various functions illustrated in the Embodiments are implemented by the processor executing the control program.

(12) The following describes embodiments of a delay adjustment device according to the present invention and their advantageous effects.

A delay adjustment device according to the present invention is installed on an apparatus connected to an external memory by a data line and a strobe line, the data line carrying a data signal, and the strobe line carrying a strobe signal that specifies when to read the data signal, the delay adjustment device performing delay adjustment on the strobe signal and comprising: a memory bandwidth monitoring unit operable to monitor a memory bandwidth and to successively output memory bandwidth information indicating the memory bandwidth, the memory bandwidth representing an amount of data transferred during transmission between the external memory and the apparatus; and a delay adjustment unit operable to perform the delay adjustment on the strobe signal with respect to the data signal in accordance with the memory bandwidth indicated by the memory bandwidth information.

A delay adjustment method according to the present invention is used by a delay adjustment device in an apparatus connected to an external memory by a data line and a strobe line, the data line carrying a data signal, and the strobe line carrying a strobe signal that specifies when to read the data signal, the delay adjustment device performing delay adjustment on the strobe signal, the delay adjustment method comprising the steps of: monitoring a memory bandwidth and successively outputting memory bandwidth information indicating the memory bandwidth, the memory bandwidth representing an amount of data transferred during transmission between the external memory and the apparatus; and performing the delay adjustment on the strobe signal with respect to the data signal in accordance with the memory bandwidth indicated by the memory bandwidth information.

With the above structure, the delay adjustment device performs the delay adjustment in accordance with the memory bandwidth in use for data transfer performed by the apparatus with the external memory connected to the apparatus. For example, when the apparatus and the external memory are transferring data, the memory bandwidth in use grows large, making it inappropriate to perform delay adjustment that determines delay based on success or failure of actual data transfer. However, with the above structure, the delay adjustment device performs the delay adjustment when data transfer is not being performed, or when the transfer amount is low.

The delay adjustment unit may perform the delay adjustment when the memory bandwidth falls below a predetermined threshold.

With the above structure, the delay adjustment device starts the delay adjustment when the memory bandwidth becomes less than the predetermined threshold.

The delay adjustment device may further comprise a storage unit for storing delay adjustment condition information specifying a predetermined condition for performing delay adjustment, wherein the delay adjustment unit additionally performs the delay adjustment when the condition specified by the delay adjustment condition information stored in the storage unit is satisfied.

The predetermined condition may be every time a predetermined interval elapses after startup of the delay adjustment device.

A delay adjustment method according to the present invention is used by a delay adjustment device in an apparatus connected to an external memory by a data line and a strobe line, the data line carrying a data signal, and the strobe line carrying a strobe signal that specifies when to read the data signal, the delay adjustment device performing delay adjustment on the strobe signal, the delay adjustment method comprising the steps of: determining whether a predetermined time has elapsed since delay adjustment; and performing the delay adjustment on the strobe signal with respect to the data signal when determining positively.

With the above structure, even if the memory bandwidth does not fall below the predetermined threshold, the delay adjustment device performs the delay adjustment regularly. The occurrence of misalignment between the data signal and the strobe signal is thus reduced.

The delay adjustment unit may perform the delay adjustment by writing test data to the external memory, reading the test data from the external memory by delaying a strobe signal output by the external memory by a predetermined amount, comparing the test data as read and the test data upon writing, thereby determining whether the data transfer succeeds, and determining an appropriate delay of the strobe signal for data transfer.

With the above structure, the delay adjustment device determines the delay at which data transfer can be reliably performed by actually transferring data and determining the delay in accordance with the success or failure of the actual data transfer.

The delay adjustment device may further comprise a memory data saving unit operable, before the delay adjustment unit performs the delay adjustment, to save data stored in a region of the external memory in which the test data is to be written.

With the above structure, when data is to be written during actual data transfer for delay adjustment, the delay adjustment device saves data existing before the delay adjustment and restores the data after delay adjustment.

INDUSTRIAL APPLICABILITY

The delay adjustment device according to the present invention is useful in a device that performs data transmission in which a data signal on a data line is read at the timing indicated by a strobe signal.

REFERENCE SIGNS LIST 1 semiconductor device
10 semiconductor integrated circuit 100 delay adjustment unit
110 access location conversion unit
111 conversion table
120 data saving unit
130 delay element unit
140 delay storage unit
150 testing unit
160 first transmission master unit
170 arbitration unit
180 memory data transceiver unit
190 memory circuit
201 test issuing unit
202 test status storage unit
203 test region indication unit
204 test flag storage unit
205 save flag storage unit
210 test start determination unit
211 test condition setting unit
212 memory bandwidth monitoring unit
213 determination unit
220 delay calculation unit
221 delay element designation unit
222 delay tap storage unit
223 tap number storage unit
224 test delay calculation unit
225 test completion determination unit
226 optimal value setting unit
230 success determination unit
231 original test data storage unit
232 read test data storage unit
233 data comparison unit
234 determination result table
301 current control line signal bit 0 delay storage unit
302 current control line signal bit 1 delay storage unit
303 current address bit 0 delay storage unit
304 current address bit 1 delay storage unit
305 current data signal bit 0 delay storage unit
306 current data signal bit 1 delay storage unit
307 current strobe signal delay storage unit
311 testing control line signal bit 0 delay storage unit
312 testing control line signal bit 1 delay storage unit
313 testing address bit 0 delay storage unit
314 testing address bit 1 delay storage unit
315 testing data signal bit 0 delay storage unit
316 testing data signal bit 1 delay storage unit
317 testing strobe signal delay storage unit
321-327 selectors
401 control line signal bit 0 delay element unit
402 control line signal bit 1 delay element unit
403 address signal bit 0 delay element unit
404 address signal bit 1 delay element unit
405 data signal bit 0 delay element unit
406 data signal bit 1 delay element unit
407 strobe signal delay element unit
501a-501n, 502a-502n delay elements
503, 504 selectors

The invention claimed is:

1. A delay adjustment device installed on an apparatus connected to an external memory by a data line and a strobe line, the data line carrying a data signal, and the strobe line carrying a strobe signal that specifies when to read the data signal, the delay adjustment device performing delay adjustment on the strobe signal and comprising:
a memory bandwidth monitoring unit operable to monitor a memory bandwidth and to successively output memory bandwidth information indicating the memory bandwidth, the memory bandwidth representing an amount of data transferred during transmission between the external memory and the apparatus;
an elapsed time measurement unit operable to measure an elapsed time since startup of the delay adjustment device;
a temperature sensor operable to measure temperature of the delay adjustment device; and
a delay adjustment unit operable to perform the delay adjustment on the strobe signal with respect to the data signal in accordance with the memory bandwidth indicated by the memory bandwidth information, the elapsed time, and the temperature.

2. The delay adjustment device of claim 1, wherein the delay adjustment unit performs the delay adjustment when the memory bandwidth falls below a predetermined threshold.

3. The delay adjustment device of claim 1, wherein the delay adjustment unit performs the delay adjustment every time a predetermined interval elapses after startup of the delay adjustment device.

4. The delay adjustment device of claim 1, further comprising:
a storage unit storing a reference value for the delay adjustment for each of a plurality of different temperature ranges, wherein
the delay adjustment unit performs the delay adjustment when the temperature measured by the temperature sensor falls in a different temperature range than a temperature previously measured by the temperature sensor.

5. The delay adjustment device of claim 1, wherein the delay adjustment unit performs the delay adjustment both when the memory bandwidth falls below a predetermined threshold and at predetermined intervals after startup.

6. The delay adjustment device of claim 1, further comprising:
a storage unit storing a reference value for the delay adjustment for each of a plurality of different temperature ranges, wherein
the delay adjustment unit performs the delay adjustment when the temperature measured by the temperature sensor falls in a different temperature range than a temperature previously measured by the temperature sensor, and at predetermined intervals after startup.

7. The delay adjustment device of claim 2, wherein the delay adjustment unit performs the delay adjustment by writing test data to the external memory, reading the test data from the external memory by delaying a strobe signal output from the external memory by a predetermined amount, comparing the test data as read and the test data upon writing, thereby determining whether the data transfer succeeds, and determining an appropriate delay of the strobe signal for data transfer, and
the delay adjustment device further comprises a memory data saving unit operable, before the delay adjustment unit performs the delay adjustment, to save data stored in a region of the external memory in which the test data is to be written.

8. A delay adjustment method used by a delay adjustment device in an apparatus connected to an external memory by a data line and a strobe line, the data line carrying a data signal, and the strobe line carrying a strobe signal that specifies when to read the data signal, the delay adjustment device performing delay adjustment on the strobe signal, the delay adjustment method comprising the steps of:
monitoring a memory bandwidth and successively outputting memory bandwidth information indicating the memory bandwidth, the memory bandwidth representing an amount of data transferred during transmission between the external memory and the apparatus;

measuring an elapsed time since startup of the delay adjustment device;

measuring temperature of the delay adjustment device with a temperature sensor provided in the delay adjustment device; and performing the delay adjustment on the strobe signal with respect to the data signal in accordance with the memory bandwidth indicated by the memory bandwidth information, the elapsed time, and the temperature.

9. The delay adjustment device of claim 3, wherein the delay adjustment unit performs the delay adjustment by writing test data to the external memory, reading the test data from the external memory by delaying a strobe signal output from the external memory by a predetermined amount, comparing the test data as read and the test data upon writing, thereby determining whether the data transfer succeeds, and determining an appropriate delay of the strobe signal for data transfer, and the delay adjustment device further comprises a memory data saving unit operable, before the delay adjustment unit performs the delay adjustment, to save data stored in a region of the external memory in which the test data is to be written.

10. The delay adjustment device of claim 4, wherein the delay adjustment unit performs the delay adjustment by writing test data to the external memory, reading the test data from the external memory by delaying a strobe signal output from the external memory by a predetermined amount, comparing the test data as read and the test data upon writing, thereby determining whether the data transfer succeeds, and determining an appropriate delay of the strobe signal for data transfer, and the delay adjustment device further comprises a memory data saving unit operable, before the delay adjustment unit performs the delay adjustment, to save data stored in a region of the external memory in which the test data is to be written.

11. The delay adjustment device of claim 5, wherein the delay adjustment unit performs the delay adjustment by writing test data to the external memory, reading the test data from the external memory by delaying a strobe signal output from the external memory by a predetermined amount, comparing the test data as read and the test data upon writing, thereby determining whether the data transfer succeeds, and determining an appropriate delay of the strobe signal for data transfer, and the delay adjustment device further comprises a memory data saving unit operable, before the delay adjustment unit performs the delay adjustment, to save data stored in a region of the external memory in which the test data is to be written.

12. The delay adjustment device of claim 6, wherein the delay adjustment unit performs the delay adjustment by writing test data to the external memory, reading the test data from the external memory by delaying a strobe signal output from the external memory by a predetermined amount, comparing the test data as read and the test data upon writing, thereby determining whether the data transfer succeeds, and determining an appropriate delay of the strobe signal for data transfer, and the delay adjustment device further comprises a memory data saving unit operable, before the delay adjustment unit performs the delay adjustment, to save data stored in a region of the external memory in which the test data is to be written.

* * * * *